(12) United States Patent
Li et al.

(10) Patent No.: US 9,848,234 B2
(45) Date of Patent: Dec. 19, 2017

(54) METHOD, CONTROL POINT, AND MEDIA RENDERER FOR DISPLAYING PICTURE

(71) Applicant: HUAWEI DEVICE (DONGGUAN) CO., LTD., Dongguan (CN)

(72) Inventors: Yan Li, Shenzhen (CN); Yu Zhu, Shenzhen (CN); Yunsheng Kuang, Shenzhen (CN); Zhenwei Shan, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 129 days.

(21) Appl. No.: 14/586,209

(22) Filed: Dec. 30, 2014

(65) Prior Publication Data

US 2015/0121443 A1    Apr. 30, 2015

Related U.S. Application Data

(63) Continuation of application No. PCT/CN2013/086486, filed on Nov. 4, 2013.

(30) Foreign Application Priority Data

Nov. 2, 2012    (CN) .......................... 2012 1 0433456

(51) Int. Cl.
*H04N 21/44* (2011.01)
*H04N 21/858* (2011.01)
(Continued)

(52) U.S. Cl.
CPC ... *H04N 21/44004* (2013.01); *H04N 1/00458* (2013.01); *H04N 1/2104* (2013.01);
(Continued)

(58) Field of Classification Search
CPC ............. H04N 21/858; H04N 21/6332; H04N 21/43615; H04N 2201/3247;
(Continued)

(56) References Cited

U.S. PATENT DOCUMENTS

| 6,026,452 A | 2/2000 | Pitts |
|---|---|---|
| 2003/0081135 A1 | 5/2003 | Boll |

(Continued)

FOREIGN PATENT DOCUMENTS

| CN | 101277450 | 10/2008 |
|---|---|---|
| CN | 101674356 | 3/2010 |

(Continued)

OTHER PUBLICATIONS

International Search Report dated Feb. 6, 2014 in corresponding International Application PCT/CN2013/086486.

(Continued)

*Primary Examiner* — Chenea Smith
(74) *Attorney, Agent, or Firm* — Staas & Halsey LLP

(57) ABSTRACT

An embodiment method includes: acquiring a uniform resource identifier URI of a first picture selected by a user; acquiring a URI of a picture to be buffered in accordance with the URI of the first picture; and sending the URI of the first picture and the URI of the picture to be buffered to a media renderer, so that the media renderer acquires the first picture according to the URI of the first picture, and displays the first picture, and acquires, the picture to be buffered in accordance with the URI of the picture to be buffered, and buffers the picture to be buffered.

18 Claims, 17 Drawing Sheets

(51) Int. Cl.
*H04N 21/436* (2011.01)
*H04N 1/00* (2006.01)
*H04N 1/21* (2006.01)
*H04N 1/32* (2006.01)
*H04N 21/47* (2011.01)
*H04N 21/239* (2011.01)
*H04N 21/426* (2011.01)
*H04N 21/6332* (2011.01)

(52) U.S. Cl.
CPC .......... *H04N 1/2183* (2013.01); *H04N 1/2195* (2013.01); *H04N 1/32117* (2013.01); *H04N 21/42653* (2013.01); *H04N 21/43615* (2013.01); *H04N 21/858* (2013.01); *H04N 21/2393* (2013.01); *H04N 21/42607* (2013.01); *H04N 21/47* (2013.01); *H04N 21/6332* (2013.01); *H04N 2201/3226* (2013.01); *H04N 2201/3247* (2013.01); *H04N 2201/3249* (2013.01)

(58) Field of Classification Search
CPC ............. H04N 1/00458; H04N 1/2104; H04N 1/2183; H04N 1/2195; H04N 1/32117; H04N 2201/3226; H04N 2201/3249; H04N 21/2393; H04N 21/42607; H04N 21/42653; H04N 21/44004; H04N 21/47
See application file for complete search history.

(56) References Cited

U.S. PATENT DOCUMENTS

| | | |
|---|---|---|
| 2004/0064834 A1 | 4/2004 | Kuwata et al. |
| 2004/0085457 A1 | 5/2004 | Thorland et al. |
| 2008/0082549 A1 | 4/2008 | Baker et al. |
| 2010/0060656 A1 | 3/2010 | Li et al. |
| 2010/0169459 A1* | 7/2010 | Biderman .......... H04N 7/17318 709/219 |
| 2012/0185608 A1* | 7/2012 | McGowan .......... G06F 17/3002 709/231 |

FOREIGN PATENT DOCUMENTS

| | | |
|---|---|---|
| CN | 102325271 | 1/2012 |
| EP | 1 041 497 A2 | 10/2000 |
| GB | 2 420 260 A | 5/2006 |
| JP | 2004-320465 | 11/2004 |
| WO | 98/57491 | 12/1998 |

OTHER PUBLICATIONS

PCT International Search Report dated Feb. 6, 2014 in corresponding International Patent Application No. PCT/CN2013/086486.
Extended European Search Report dated Jul. 31, 2015 in corresponding European Patent Application No. 13850641.5.

* cited by examiner

METHOD, CONTROL POINT, AND MEDIA RENDERER FOR DISPLAYING PICTURE

CROSS-REFERENCE TO RELATED APPLICATIONS

This application is a continuation of International Application No. PCT/CN2013/086486, filed on Nov. 4, 2013, which claims priority to Chinese Patent Application No. 201210433456.8, filed on Nov. 2, 2012, both of which are hereby incorporated by reference in their entireties.

TECHNICAL FIELD

The present invention relates to the field of communications technologies, and in particular, to a method, control point, and media renderer for displaying a picture.

BACKGROUND

With development of digital homes and digitization of consumer electronics, various digital devices at home may constitute a home network. Content on a device in the home network may be shared with other devices in the home network by using the home network.

For example, an MR (Media Renderer, media renderer), an MS (Media Server, media server), and a CP (Control Point, control device) are devices constituting the home network. The CP is a control device in the home network, and the CP stores a URI (Uniform Resource Identifier, uniform resource identifier) of a picture stored in the MS. A user may select a picture from the CP, and the CP sends a URI of the picture selected by the user to the MR. The MR acquires the picture from the MS according to the URI of the picture and displays the picture. Thereby, sharing of the picture in the MS with the MR is implemented.

Each time the user selects a picture, the MR needs to perform a process of acquiring the picture according to the picture selected by the user. Consequently, it is necessary to wait for a period of time before a picture can be displayed on the MR every time.

SUMMARY

An embodiment method includes:

acquiring a uniform resource identifier URI of a first picture selected by a user;

acquiring, according to the URI of the first picture, a URI of a picture to be buffered, where the picture to be buffered is a preset quantity of pictures adjacent to the first picture or another picture in a folder in which the first picture is located except the first picture; and sending the URI of the first picture and the URI of the picture to be buffered to a media renderer, so that the media renderer acquires the first picture according to the URI of the first picture, and displays the first picture, and acquires, according to the URI of the picture to be buffered, the picture to be buffered, and buffers the picture to be buffered.

An embodiment method includes:

receiving a URI of a first picture and a URI of a picture to be buffered, which are sent by a control point, where the picture to be buffered is a preset quantity of pictures adjacent to the first picture or another picture in a folder in which the first picture is located except the first picture; and acquiring the first picture according to the URI of the first picture, and displaying the first picture, and acquiring, according to the URI of the picture to be buffered, the picture to be buffered, and buffering the picture to be buffered.

An embodiment a control point includes:

a first acquiring module, configured to acquire a uniform resource identifier URI of a first picture selected by a user;

a second acquiring module, configured to acquire, according to the URI of the first picture, a URI of a picture to be buffered, where the picture to be buffered is a preset quantity of pictures adjacent to the first picture or another picture in a folder in which the first picture is located except the first picture; and a first sending module, configured to send the URI of the first picture and the URI of the picture to be buffered to a media renderer, so that the media renderer acquires the first picture according to the URI of the first picture, and displays the first picture, and acquires, according to the URI of the picture to be buffered, the picture to be buffered, and buffers the picture to be buffered.

An embodiment a media renderer includes:

a first receiving module, configured to receive a URI of a first picture and a URI of a picture to be buffered, which are sent by a control point, where the picture to be buffered is a preset quantity of pictures adjacent to the first picture or another picture in a folder in which the first picture is located except the first picture; and a displaying module, configured to acquire the first picture according to the URI of the first picture, and display the first picture, and acquire, according to the URI of the picture to be buffered, the picture to be buffered, and buffer the picture to be buffered.

A URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Embodiment 1

Figure 1:
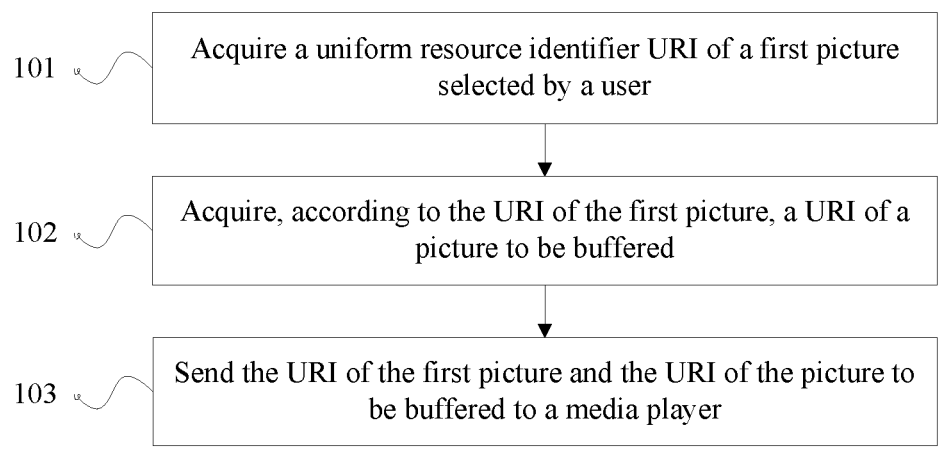
FIG. 1 is a flowchart of an embodiment method for displaying a picture according to Embodiment 1 of the present invention.

Referring to FIG. 1, an embodiment of the present invention provides a method for displaying a picture. It should be noted that the embodiment of the present invention is a process of acquiring a picture selected by a user, and determining, according to the picture selected by the user, a picture to be buffered, and sending the picture selected by the user and the picture to be buffered to a media renderer, where a control point is used as an executor.

A procedure of the method includes:

101. Acquire a uniform resource identifier URI of a first picture selected by a user.

102. Acquire, according to the URI of the first picture, a URI of a picture to be buffered, where the picture to be buffered is a preset quantity of pictures adjacent to the first picture or another picture in a folder in which the first picture is located except the first picture.

103. Send the URI of the first picture and the URI of the picture to be buffered to a media renderer, so that the media renderer acquires the first picture according to the URI of the first picture, and displays the first picture, and acquires, according to the URI of the picture to be buffered, the picture to be buffered, and buffers the picture to be buffered.

In a specific implementation manner, a specific scenario may be that a media server and a control point are disposed on one device, for example, a picture on a mobile phone is pushed to a television for displaying, where the mobile phone is a media server and control point, and the television is a media renderer. Another scenario may be that a media server and a control point are not disposed on one device, for example, a picture on a computer is viewed by using a mobile phone, and is pushed to a television for displaying; and therefore, the mobile phone is a control point, the computer is a media server, and the television is a media renderer.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

Embodiment 2

Figure 2:
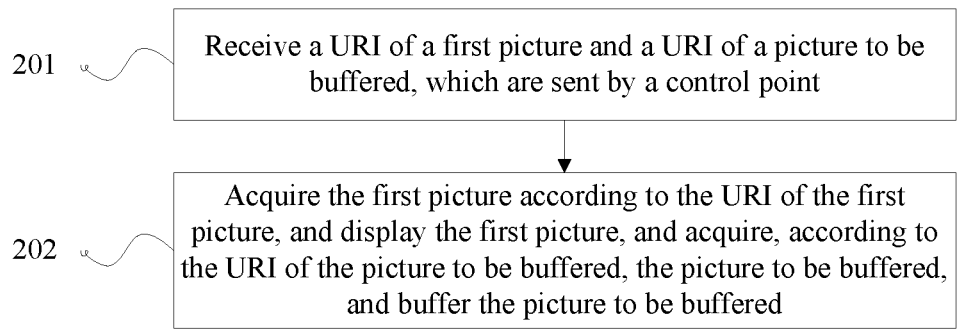
FIG. 2 is a flowchart of an embodiment method for displaying a picture according to Embodiment 2 of the present invention.

Referring to FIG. 2, an embodiment of the present invention provides a method for displaying a picture. It should be noted that the embodiment of the present invention is a process of receiving a URI of a picture selected by a user and sent by a control point, and determining, according to the URI of the picture selected by the user, a URI of a picture to be buffered, and acquiring, according to the URI of the picture selected by the user, the picture selected by the user, and displaying the picture selected by the user, and acquiring, according to the URI of the picture to be buffered, the picture to be buffered, and buffering the picture to be buffered, where a media server is used as an executor.

A procedure of the method includes:

201. Receive a URI of a first picture and a URI of a picture to be buffered, which are sent by a control point, where the picture to be buffered is a preset quantity of pictures adjacent to the first picture or another picture in a folder in which the first picture is located except the first picture.

202. Acquire the first picture according to the URI of the first picture, and display the first picture, and acquire, according to the URI of the picture to be buffered, the picture to be buffered, and buffer the picture to be buffered.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

Embodiment 3

Figure 3A:
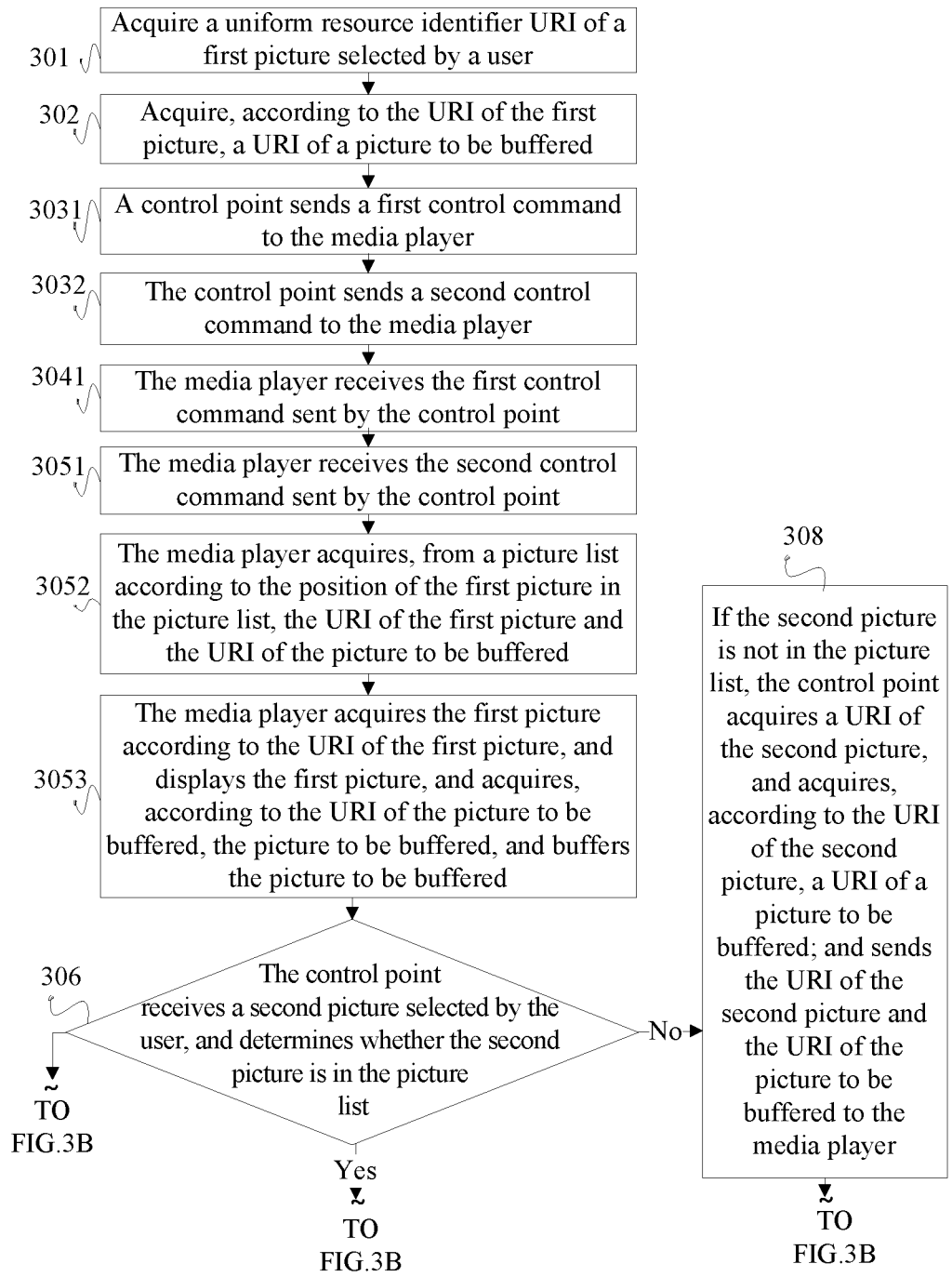
FIG. 3A, FIG. 3B, and FIG. 3C are a flowchart of an embodiment method for displaying a picture according to Embodiment 3 of the present invention.
Figure 3B:
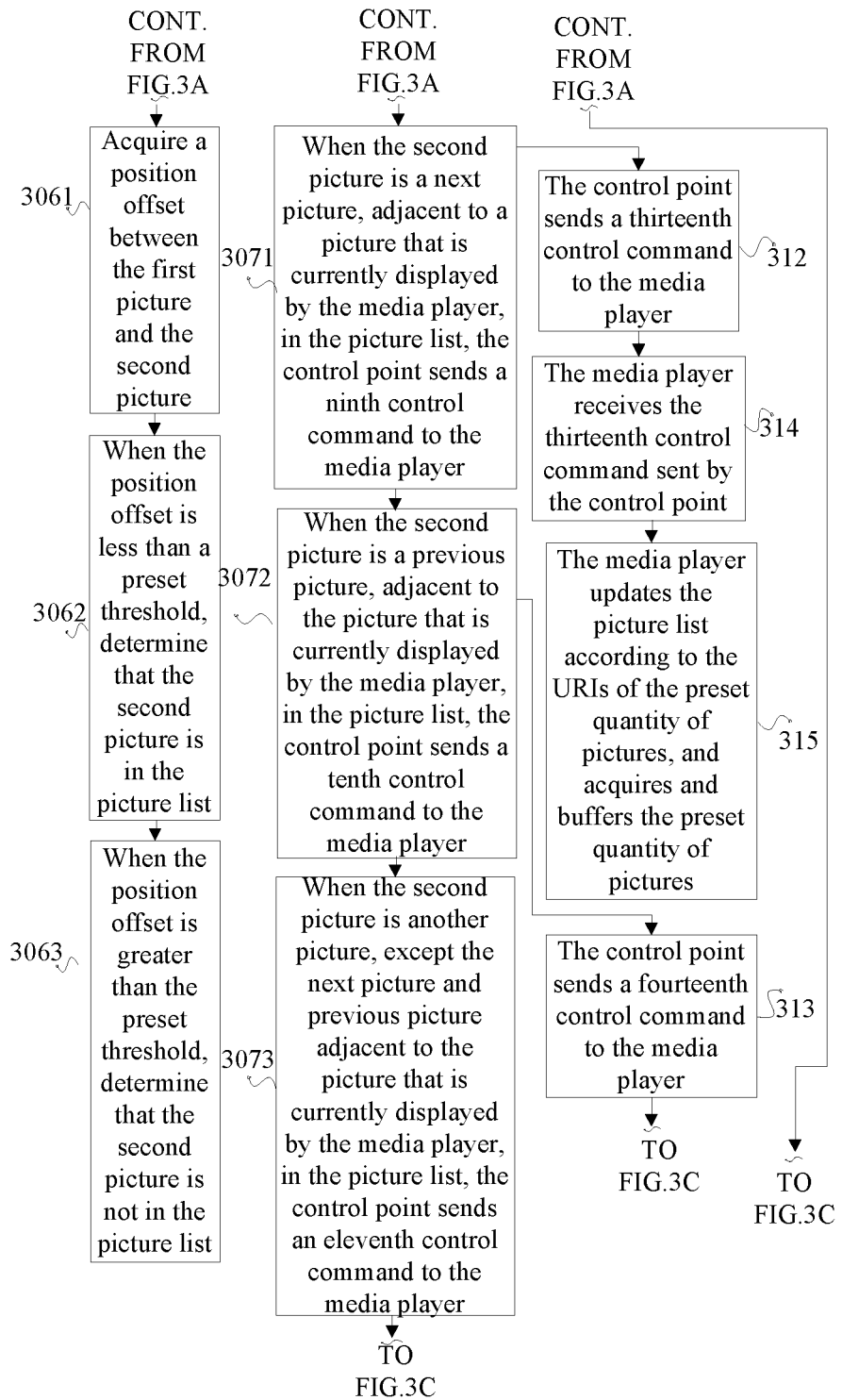
Figure 3C:
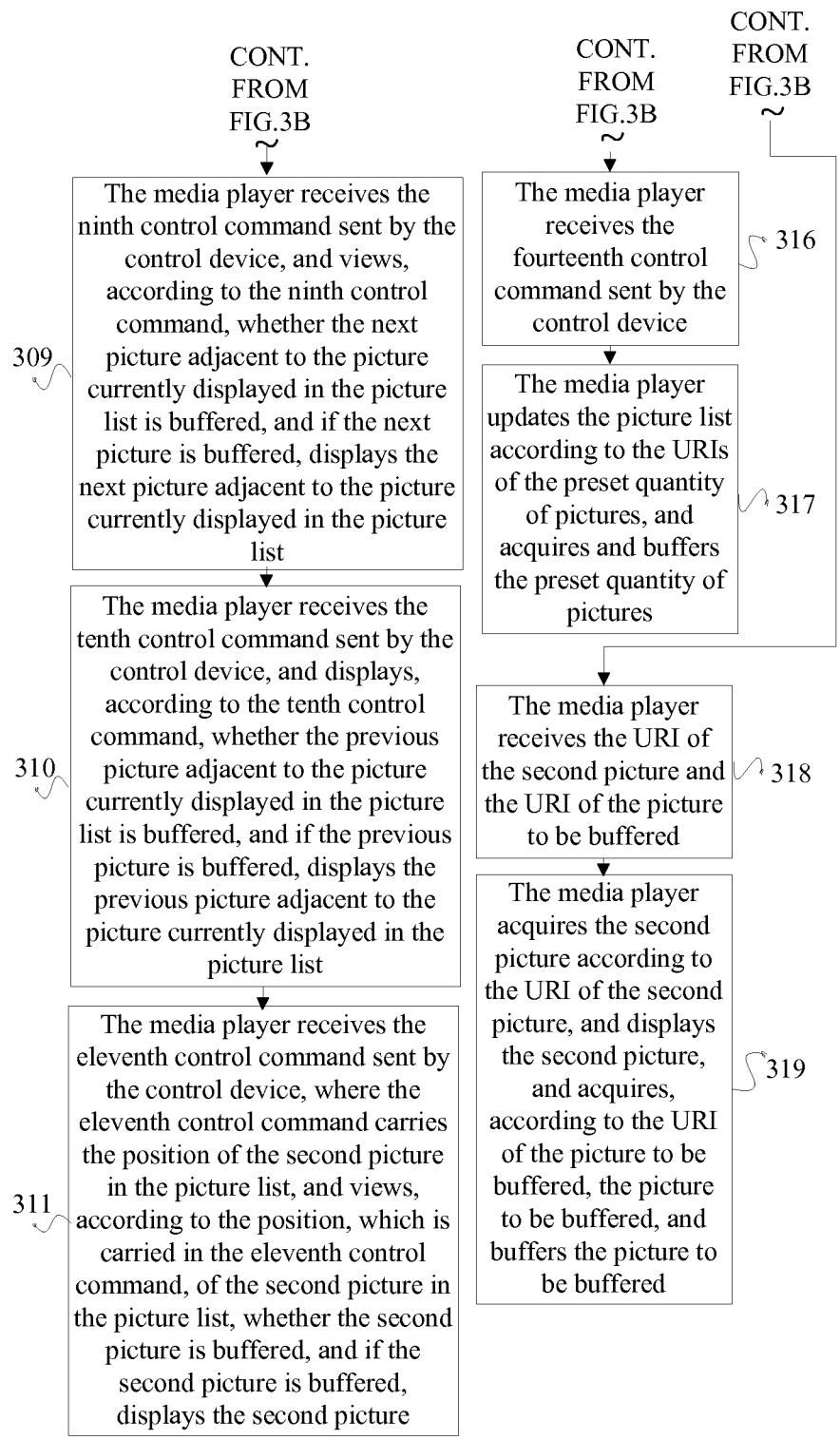
Figure 4A:
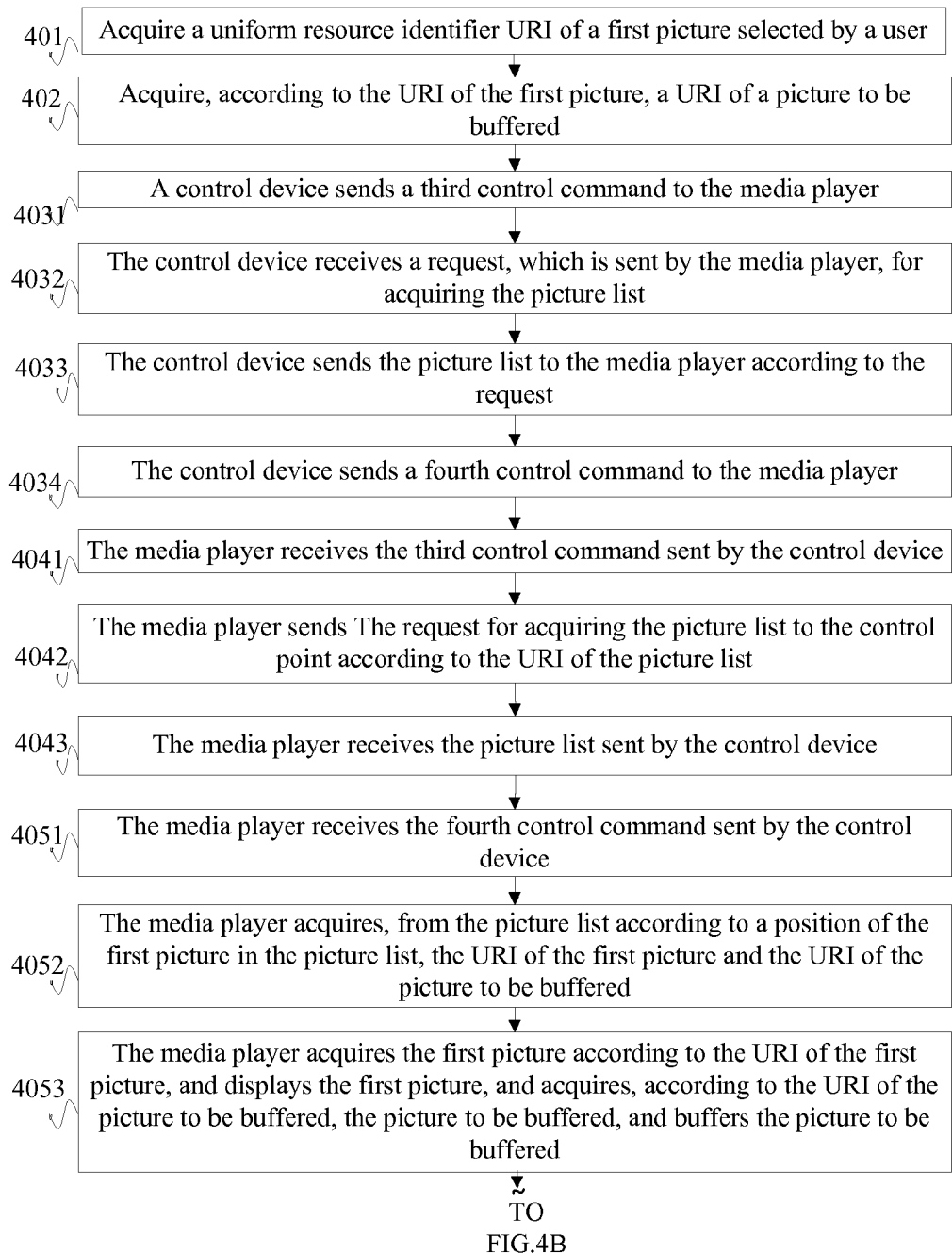
FIG. 4A, FIG. 4B, FIG. 4C, and FIG. 4D are a flowchart of an embodiment method for displaying a picture according to Embodiment 4 of the present invention.
Figure 4B:
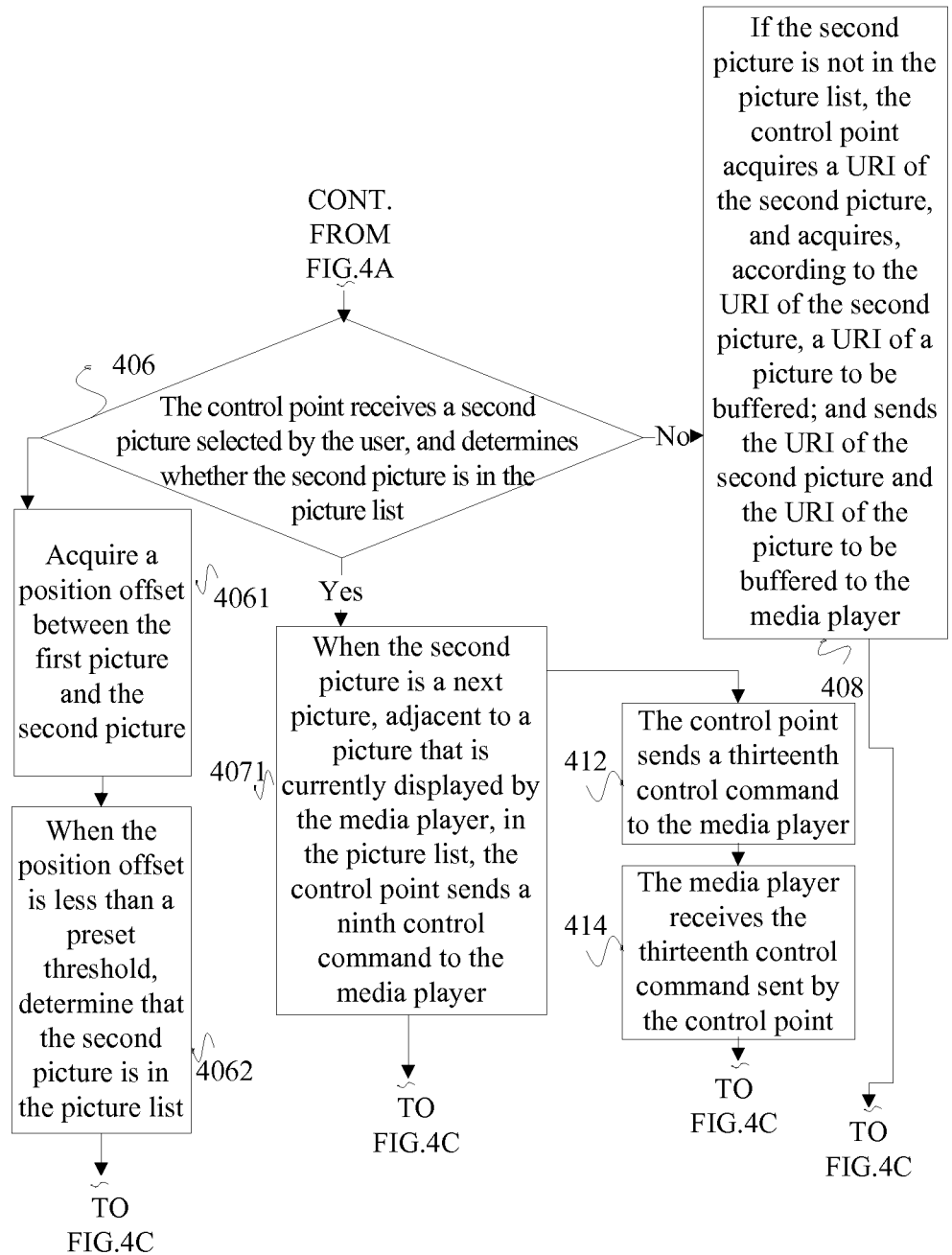
Figure 4C:
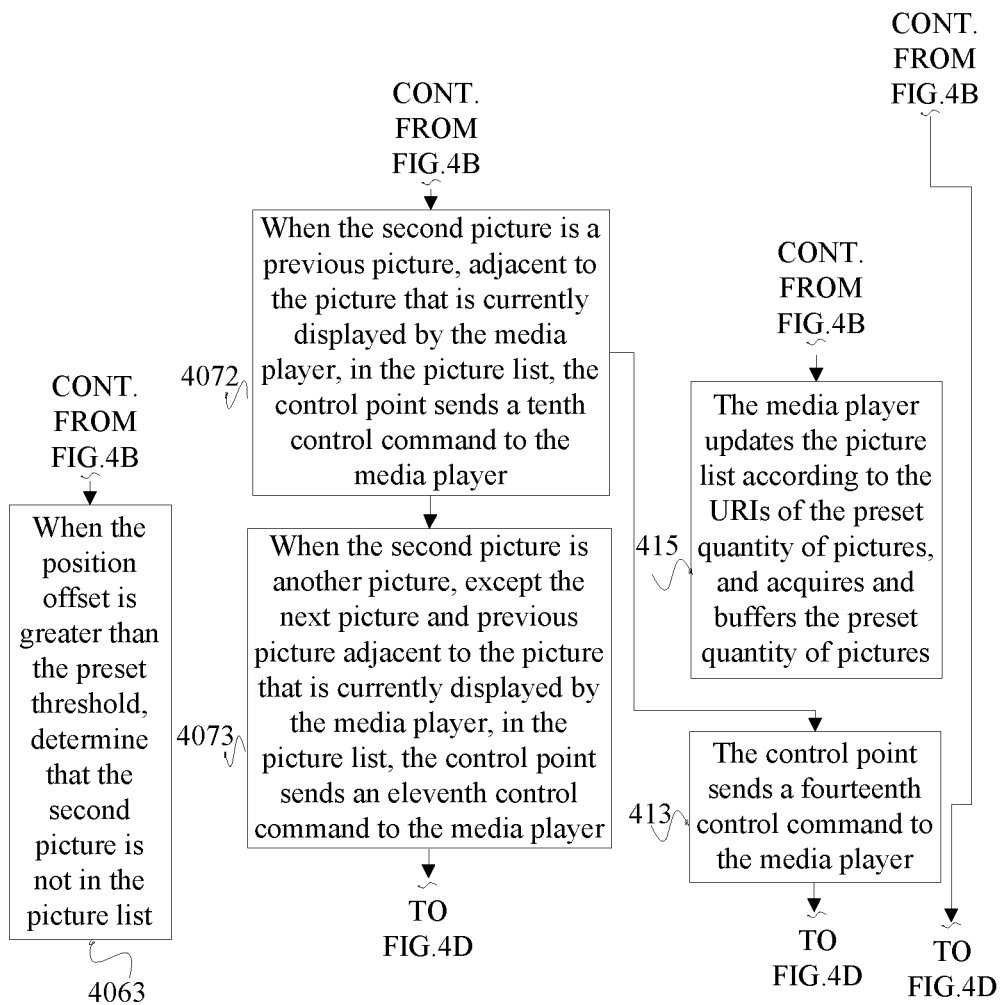
Figure 4D:
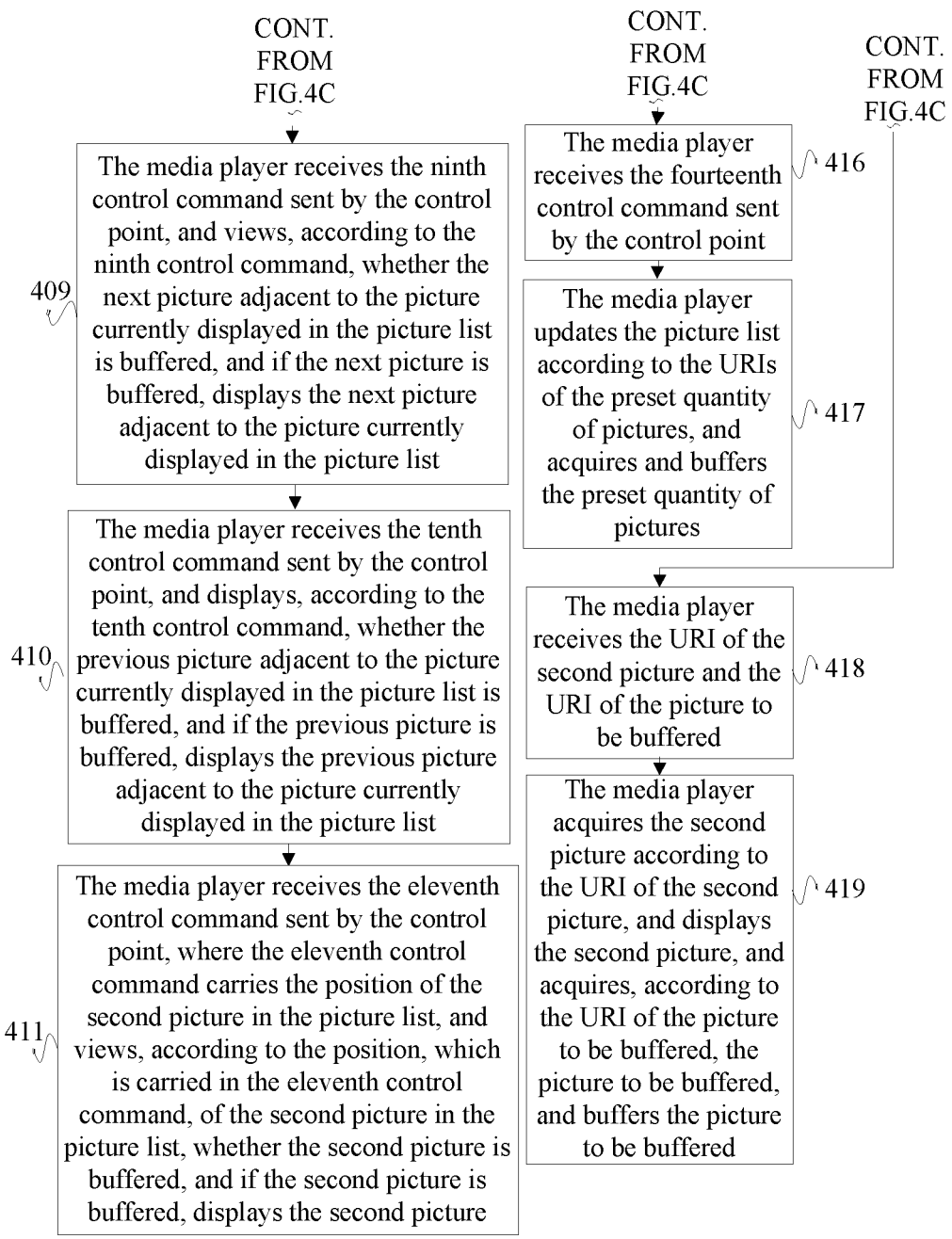

Referring to FIG. 3A, FIG. 3B, and FIG. 3C, an embodiment of the present invention provides a method for displaying a picture. It should be noted that the embodiment of the present invention is an improvement of Embodiment 1 and Embodiment 2.

A procedure of the method includes:

301. Acquire a uniform resource identifier URI of a first picture selected by a user.

302. Acquire, according to the URI of the first picture, a URI of a picture to be buffered, where the picture to be buffered is a preset quantity of pictures adjacent to the first picture or another picture in a folder in which the first picture is located except the first picture.

Specifically, after the user selects the first picture to be displayed, there may be two cases of determining a range of pictures to be buffered. The first case is, in the same folder in which the user currently selects the picture, previous and next pictures adjacent to the picture are used as the pictures to be buffered, where the previous and next pictures adjacent to the picture may be determined according to an index of the picture selected by the user in the folder, and pictures to be buffered is m pictures before the index of the picture selected by the user, and/or n pictures after the index of the picture selected by the user, where m and n are positive integers. The second case is that, in the same folder in which the user currently selects the picture, all pictures are used as the pictures to be buffered.

303. Send the URI of the first picture and the URI of the picture to be buffered to a media renderer, so that the media renderer acquires the first picture according to the URI of the first picture, and displays the first picture, and acquires, according to the URI of the picture to be buffered, the picture to be buffered, and buffers the picture to be buffered.

Sending the URI of the first picture and the URI of the picture to be buffered may be divided into two steps, and therefore, step 303 includes:

3031. A control point sends a first control command to the media renderer, where the first control command carries a picture list, where the picture list includes the URI of the first picture and the URI of the picture to be buffered.

Specifically, the control point sends the picture list to the media renderer by invoking SetAVTransportURI( ) action.

Further, the picture list includes the URI of the first picture selected by the user and the URI of the picture to be buffered, where the URI carries content such as a name of a host storing the picture, path information, a relative storage position in the host, and a name of the stored picture.

In the picture list, URIs of the first picture and the picture to be buffered are stored in sequence. Using the following table as an example for description, URI3 is the first picture selected by the user, and URI1, URI2, URI4, and URI5 are the pictures to be buffered, as shown in Table 1.

TABLE 1

| Position | URI |
|---|---|
| 1 | URI1 |
| 2 | URI2 |
| 3 | URI3 |
| 4 | URI4 |
| 5 | URI5 |

3032. The control point sends a second control command to the media renderer, where the second control command carries a position of the first picture in the picture list, so that the media renderer acquires the first picture according to the position of the first picture in the picture list and the picture list, and displays the first picture, and acquires and buffers the picture to be buffered.

Specifically, the control point sends the control command to the media renderer by invoking Seek( ) action, where the control command carries number information of a currently displayed picture (for example, a third picture in a playlist), so that the media renderer first displays the picture selected by the user.

Further, the position, which is carried in the second control command, of the first picture in the picture list is further described by using the example in Table 1. The position, which is carried in the second control command, of the first picture in the picture list is 3, and therefore, the media renderer determines the first picture according to URI3 corresponding to position 3, and acquires the first picture according to the URI3, and displays the first picture. At this time, the other URI1, URI2, URI4, and URI5 may be determined as the pictures to be buffered, and the four pictures are acquired and buffered.

304. The media renderer receives the URI of the first picture and the URI of the picture to be buffered, which are sent by the control point, where the picture to be buffered is the preset quantity of pictures adjacent to the first picture or another picture in a folder in which the first picture is located except the first picture.

Corresponding to the two manners of sending, by the control point, the URI of the first picture and the URI of the picture to be buffered to the media renderer, there are also two manners of receiving the URI of the first picture and the URI of the picture to be buffered. Therefore, step 304 includes 3041, which are specifically as follows:

A step corresponding to step 3031 is:

3041. The media renderer receives the first control command sent by the control point, where the first control command carries the picture list, where the picture list includes the URI of the first picture and the URI of the picture to be buffered.

305. The media renderer acquires the first picture according to the URI of the first picture, and displays the first picture, and acquires, according to the URI of the picture to be buffered, the picture to be buffered, and buffers the picture to be buffered.

Correspondingly, after the media renderer receives, in step 3041, the URI of the first picture and the URI of the picture to be buffered, a process of displaying and buffering, by the media renderer, the picture to be buffered includes 3051 to 3053, which are specifically as follows:

3051. The media renderer receives the second control command sent by the control point, where the second control command carries the position of the first picture in the picture list.

The media renderer downloads the picture from a media server according to the received Seek( ) action and by using the URI of the picture selected by the user from the picture list, and displays the picture. Meanwhile, the media renderer downloads, from the media server according to a URI of a picture to be displayed in the picture list, the picture to be displayed, and buffers the picture to be displayed. The download manner is downloading, from the media server by using HTTP GET, the picture that is selected by the user in step 301, and displaying the picture.

3052. The media renderer acquires, from the picture list according to the position of the first picture in the picture list, the URI of the first picture and the URI of the picture to be buffered.

3053. The media renderer acquires the first picture according to the URI of the first picture, and displays the first picture, and acquires, according to the URI of the picture to be buffered, the picture to be buffered, and buffers the picture to be buffered.

306. The control point receives a second picture selected by the user, and determines whether the second picture is in the picture list.

The second picture is a picture that is reselected by the user after the first picture is selected, and needs to be displayed on the media renderer.

Preferably, when whether the second picture is in the picture list is determined, a counter n may be set in the control point, where an initial value of n is 0. At this time, an offset between the first picture initially selected by the user and the second picture is counted. This manner is an optional step.

When next( ) action is sent to the media renderer, 1 is added to the counter, that is, n=n+1; when previous( ) action is sent to the media renderer, 1 is subtracted from the counter, that is, n=n−1; when seek( )action is sent to the media renderer, corresponding k is added to or subtracted from the counter according to an position offset variation of a target picture in seek( )action, that is, n=n+k/n−k. A threshold a is preset, and its function is to determine whether |n| exceeds the threshold. If |n|>=a, the control point creates a new playlist, and sends the new playlist to the media renderer; and if |n|<a, the media renderer continues to receive a next control command, and performs, according to the next control command, counting and operations after the counting. Further, when the picture to be buffered is all other pictures in the folder in which the first picture is located, it is unnecessary to perform the offset calculation process in this step.

Therefore, step 306 further includes 3061 to 3063, which are specifically as follows:

3061. Acquire a position offset between the first picture and the second picture.

3062. When the position offset is less than a preset threshold, determine that the second picture is in the picture list.

3063. When the position offset is greater than the preset threshold, determine that the second picture is not in the picture list.

307. When the second picture is in the picture list, the control point sends a control command to the media renderer according to a position of the second picture in the picture list, so that the media renderer displays the second picture according to the control command.

Specifically, when the second picture is in the picture list, different control commands are selected according to the position of the second picture in the picture list, and sent to the media renderer, so that the media renderer selects different pictures according to the different control commands, for displaying. Therefore, step 307 includes 3071 to 3073, which are specifically as follows:

3071. When the second picture is a next picture, adjacent to a picture that is currently displayed by the media renderer, in the picture list, the control point sends a ninth control command to the media renderer, so that the media renderer displays the next picture adjacent to the picture that is currently displayed by the media renderer.

At this time, the ninth control command sent by the control point to the media renderer is a next( ) action command.

Preferably, after the control point sends to the media renderer the command for displaying the next picture adjacent to the picture that is currently displayed, the picture list may be further updated dynamically, so that the media renderer continuously updates the picture list to improve efficiency of displaying pictures. Therefore, after step 3061, the control point continues to send a control command to the media renderer, to notify the media renderer of a URI of a picture that needs to be updated when the media renderer updates the picture list dynamically. At this time, step 312 is performed.

3072. When the second picture is a previous picture, adjacent to the picture that is currently displayed by the media renderer, in the picture list, the control point sends a tenth control command to the media renderer, so that the media renderer displays the previous picture adjacent to the picture that is currently displayed by the media renderer.

At this time, the tenth control command sent by the control point to the media renderer is a previous( )action command.

Preferably, after the control point sends to the media renderer the command for displaying the previous picture adjacent to the picture that is currently displayed, the picture list may be further updated dynamically, so that the media renderer continuously updates the picture list to improve efficiency of displaying pictures. Therefore, after step 3072, the control point continues to send a control command to the media renderer, to notify the media renderer of a URI of a picture that needs to be updated when the media renderer updates the picture list dynamically. At this time, step 313 is performed.

3073. When the second picture is another picture, except the next picture and previous picture adjacent to the picture that is currently displayed by the media renderer, in the picture list, the control point sends an eleventh control command to the media renderer, where the eleventh control command carries the position of the second picture in the picture list, so that the media renderer displays the second picture according to the position of the second picture in the picture list.

At this time, the eleventh control command sent by the control point to the media renderer is a seek( )action command, where the seek( )action command carries the position of the second picture in the picture list.

308. When the second picture is not in the picture list, the control point acquires a URI of the second picture, and acquires, according to the URI of the second picture, a URI of a picture to be buffered, where the picture to be buffered is a preset quantity of pictures adjacent to the second picture or other pictures than the second picture in a folder in which the second picture is located; and sends the URI of the second picture and the URI of the picture to be buffered to the media renderer, so that the media renderer acquires the second picture according to the URI of the second picture, and displays the second picture, and the media renderer acquires, according to the URI of the picture to be buffered, the picture to be buffered, and buffers the picture to be buffered.

At this time, the second picture selected by the user is not in the picture list. At this time, there may be two cases. The first case is that the second picture selected by the user and the first picture are in the same folder, but the second picture is not in the picture list at this time; the second case is that the second picture selected by the user and the first picture are not in the same folder.

Further, when the control point finds that the second picture selected by the user is not in the picture list, the control point sends a SetAVTransport URI( )action command to the media renderer, and performs a step of acquiring, according to the URI of the second picture, the URI of the picture to be buffered, and sending the URI of the second picture and the URI of the picture to be buffered to the media renderer, that is, performing the initial process repeatedly, so that the media renderer re-creates a picture list according to the URI that is sent at this time.

309. The media renderer receives the ninth control command sent by the control point, and views, according to the ninth control command, whether the next picture adjacent to the picture currently displayed in the picture list is buffered, and when the next picture is buffered, displays the next picture adjacent to the picture currently displayed in the picture list.

Correspondingly, in step 309, the ninth control command sent by the control point in step 3071 is received.

310. The media renderer receives the tenth control command sent by the control point, and displays, according to the tenth control command, whether the previous picture adjacent to the picture currently displayed in the picture list is buffered, and when the previous picture is buffered, displays the previous picture adjacent to the picture currently displayed in the picture list.

Correspondingly, in step 310, the tenth control command sent by the control point in step 3072 is received.

311. The media renderer receives the eleventh control command sent by the control point, where the eleventh control command carries the position of the second picture in the picture list, and views, according to the position, which is carried in the eleventh control command, of the second picture in the picture list, whether the second picture is buffered, and when the second picture is buffered, displays the second picture.

Correspondingly, in step 311, the eleventh control command sent by the control point in step 3073 is received.

312. The control point sends a thirteenth control command to the media renderer, where the thirteenth control command carries URIs of a preset quantity of adjacent pictures after a last picture in the picture list, so that the media renderer updates the picture list, and acquires the preset quantity of pictures according to the URIs of the preset quantity of pictures, and buffers the preset quantity of pictures.

Specifically, the thirteenth control command sent by the control point to the media renderer is an AddNext( )action command.

313. The control point sends a fourteenth control command to the media renderer, where the fourteenth control command carries URIs of a preset quantity of adjacent pictures before a foremost picture in the picture list, so that the media renderer updates the picture list, and acquires the preset quantity of pictures according to the URIs of the preset quantity of pictures, and buffers the preset quantity of pictures.

Specifically, the fourteenth control command sent by the control point to the media renderer is an AddPrevious( )action command.

314. The media renderer receives the thirteenth control command sent by the control point, where the thirteenth control command carries the URIs of the preset quantity of adjacent pictures after the last picture in the picture list.

315. The media renderer updates the picture list according to the URIs of the preset quantity of pictures, and acquires and buffers the preset quantity of pictures.

Correspondingly, the media renderer receives the thirteenth control command that is sent by the control point in step 312, updates the picture list according to the control command, and acquires the picture to be buffered.

316. The media renderer receives the fourteenth control command sent by the control point, where the fourteenth control command carries the URIs of the preset quantity of adjacent pictures before the foremost picture in the picture list.

317. The media renderer updates the picture list according to the URIs of the preset quantity of pictures, and acquires and buffers the preset quantity of pictures.

Correspondingly, the media renderer receives the fourteenth control command that is sent by the control point in step 313, updates the picture list according to the control command, and acquires the picture to be buffered.

318. The media renderer receives the URI of the second picture and the URI of the picture to be buffered, where the picture to be buffered is the preset quantity of pictures adjacent to the second picture or another picture in a folder in which the second picture is located except the second picture.

Corresponding to step 308, when the second picture selected by the user and received by the control point is not in the picture list, the media renderer receives the URI of the second picture and the URI of the picture to be buffered, which are sent by the control point, are received again.

319. The media renderer acquires the second picture according to the URI of the second picture, and displays the second picture, and acquires, according to the URI of the picture to be buffered, the picture to be buffered, and buffers the picture to be buffered.

After the URI of the second picture and the URI of the picture to be buffered are received in step 318, the second picture is acquired according to the URI of the second picture, and displayed, and the picture to be buffered is acquired according to the URI of the picture to be buffered, and buffered.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

Embodiment 4

Referring to FIG. 4A, FIG. 4B, FIG. 4C, and FIG. 4D, an embodiment of the present invention provides a method for displaying a picture. It should be noted that the embodiment of the present invention is an improvement of Embodiment 1 and Embodiment 2.

A procedure of the method includes:

401. Acquire a uniform resource identifier URI of a first picture selected by a user.

402. Acquire, according to the URI of the first picture, a URI of a picture to be buffered, where the picture to be buffered is a preset quantity of pictures adjacent to the first picture or another picture in a folder in which the first picture is located except the first picture.

Specifically, after the user selects the first picture to be displayed, there may be two cases of determining a range of pictures to be buffered. The first case is, in the same folder in which the user currently selects the picture, previous and next pictures adjacent to the picture are used as the pictures to be buffered, where the previous and next pictures adjacent to the picture may be determined according to an index of the picture selected by the user in the folder, and pictures to be buffered is m pictures before the index of the picture selected by the user, and/or n pictures after the index of the picture selected by the user, where m and n are positive integers. The second case is that, in the same folder in which the user currently selects the picture, all pictures are used as the pictures to be buffered.

403. Send the URI of the first picture and the URI of the picture to be buffered to a media renderer, so that the media renderer acquires the first picture according to the URI of the first picture, and displays the first picture, and acquires, according to the URI of the picture to be buffered, the picture to be buffered, and buffers the picture to be buffered.

Sending the URI of the first picture and the URI of the picture to be buffered includes step 4031 to step 4034. Therefore, step 403 includes:

4031. A control point sends a third control command to the media renderer, where the third control command carries a URI of a picture list.

The control point sends the URI of the picture list to the media renderer by invoking SetAVTransportURI( ) action.

In the embodiment of the present invention, the control point does not directly send a picture list that carries the URI of the first picture and the URI of the picture to be buffered to the media renderer, but sends the URI of the picture list which is stored in the control point, so that after acquiring the URI of the picture list, the media renderer sends a request for acquiring the picture list to the control point.

4032. The control point receives a request, which is sent by the media renderer, for acquiring the picture list, where the request carries the URI of the picture list.

The media renderer sends the request for acquiring the picture list to the control point by using HTTP GET.

4033. The control point sends the picture list to the media renderer according to the request, where the picture list includes the URI of the first picture and the URI of the picture to be buffered.

4034. The control point sends a fourth control command to the media renderer, where the fourth control command carries a position of the first picture in the picture list, so that the media renderer acquires the first picture according to the position of the first picture in the picture list and the picture list, and displays the first picture, and acquires and buffers the picture to be buffered.

The control point sends the control command to the media renderer by invoking Seek( ) action, where the control command carries number information of a currently displayed picture (for example, a third picture in a playlist), so that the media renderer first displays the picture selected by the user.

404. The media renderer receives the URI of the first picture and the URI of the picture to be buffered, which are sent by the control point, where the picture to be buffered is the preset quantity of pictures adjacent to the second picture or another picture in a folder in which the second picture is located except the second picture.

Corresponding to the two manners of sending, by the control point, the URI of the first picture and the URI of the picture to be buffered to the media renderer, there are also two manners of receiving the URI of the first picture and the URI of the picture to be buffered. Therefore, step 404 includes step 4041 to step 4043, which are specifically as follows:

4041. The media renderer receives the third control command sent by the control point, where the third control command carries the URI of the picture list.

4042. The media renderer sends the request for acquiring the picture list to the control point according to the URI of the picture list.

4043. The media renderer receives the picture list sent by the control point, where the picture list includes the URI of the first picture and the URI of the picture to be buffered.

405. The media renderer acquires the first picture according to the URI of the first picture, and displays the first picture, and acquires, according to the URI of the picture to be buffered, the picture to be buffered, and buffers the picture to be buffered.

Correspondingly, after the media renderer receives the picture list in step 4043, step 405 includes step 4051 to step 4053, which are specifically as follows:

4051. The media renderer receives the fourth control command sent by the control point, where the fourth control command carries the position of the first picture in the picture list.

The media renderer downloads the picture from a media server according to the received Seek( ) action and by using the URI of the picture selected by the user from the picture list, and displays the picture. Meanwhile, the media renderer downloads, from the media server according to a URI of a picture to be displayed in the picture list, the picture to be displayed, and buffers the picture to be displayed. The download manner is downloading, from the media server by using HTTP GET, the picture that is selected by the user in step 401, and displaying the picture.

4052. The media renderer acquires, from the picture list according to the position of the first picture in the picture list, the URI of the first picture and the URI of the picture to be buffered.

4053. The media renderer acquires the first picture according to the URI of the first picture, and displays the first picture, and acquires, according to the URI of the picture to be buffered, the picture to be buffered, and buffers the picture to be buffered.

406. The control point receives a second picture selected by the user, and determines whether the second picture is in the picture list.

The second picture is a picture that is reselected by the user after the first picture is selected, and needs to be displayed on the media renderer.

Preferably, when whether the second picture is in the picture list is determined, a counter n may be set in the control point, where an initial value of n is 0. At this time, an offset between the first picture initially selected by the user and the second picture is counted. This manner is an optional step.

When next( ) action is sent to the media renderer, 1 is added to the counter, that is, n=n+1; when previous( ) action is sent to the media renderer, 1 is subtracted from the counter, that is, n=n−1; when seek( )action is sent to the media renderer, corresponding k is added to or subtracted from the counter according to an position offset variation of a target picture in seek( )action, that is, n=n+k/n−k. A threshold a is preset, and its function is to determine whether |n| exceeds the threshold. If |n|>=a, the control point creates a new playlist, and sends the new playlist to the media renderer; and if |n|<a, the media renderer continues to receive a next control command, and performs, according to the next control command, counting and operations after the counting. Further, when the picture to be buffered is all other files in the folder in which the first picture is located, it is unnecessary to perform the offset calculation process in this step.

Therefore, step 406 further includes step 4061 to step 4063, which are specifically as follows:

4061. Acquire a position offset between the first picture and the second picture.

4062. When the position offset is less than a preset threshold, determine that the second picture is in the picture list.

4063. When the position offset is greater than the preset threshold, determine that the second picture is not in the picture list.

407. If the second picture is in the picture list, the control point sends a control command to the media renderer according to a position of the second picture in the picture list, so that the media renderer displays the second picture according to the control command.

Specifically, when the second picture is in the picture list, different control commands are selected according to the position of the second picture in the picture list, and sent to the media renderer, so that the media renderer selects different pictures according to the different control commands, for displaying. Therefore, step 407 includes 4071 to 4073, which are specifically as follows:

4071. When the second picture is a next picture, adjacent to a picture that is currently displayed by the media renderer, in the picture list, the control point sends a ninth control command to the media renderer, so that the media renderer displays the next picture adjacent to the picture that is currently displayed by the media renderer.

At this time, the ninth control command sent by the control point to the media renderer is a next( ) action command.

Preferably, after the control point sends to the media renderer the command for displaying the next picture adjacent to the picture that is currently displayed, the picture list may be further updated dynamically, so that the media renderer continuously updates the picture list to improve efficiency of displaying pictures. Therefore, after step 4071, the control point continues to send a control command to the media renderer, to notify the media renderer of a URI of a picture that needs to be updated when the media renderer updates the picture list dynamically. At this time, step 412 is performed.

4072. When the second picture is a previous picture, adjacent to the picture that is currently displayed by the media renderer, in the picture list, the control point sends a tenth control command to the media renderer, so that the media renderer displays the previous picture adjacent to the picture that is currently displayed by the media renderer.

At this time, the tenth control command sent by the control point to the media renderer is a previous( )action command.

Preferably, after the control point sends to the media renderer the command for displaying the previous picture adjacent to the picture that is currently displayed, the picture list may be further updated dynamically, so that the media renderer continuously updates the picture list to improve efficiency of displaying pictures. Therefore, after step 4072, the control point continues to send a control command to the media renderer, to notify the media renderer of a URI of a picture that needs to be updated when the media renderer updates the picture list dynamically. At this time, step 413 is performed.

4073. When the second picture is another picture, except the next picture and previous picture adjacent to the picture that is currently displayed by the media renderer, in the picture list, the control point sends an eleventh control command to the media renderer, where the eleventh control command carries the position of the second picture in the picture list, so that the media renderer displays the second picture according to the position of the second picture in the picture list.

At this time, the eleventh control command sent by the control point to the media renderer is a seek( )action command, where the seek( )action command carries the position of the second picture in the picture list.

408. If the second picture is not in the picture list, the control point acquires a URI of the second picture, and acquires, according to the URI of the second picture, a URI of a picture to be buffered, where the picture to be buffered is a preset quantity of pictures adjacent to the second picture or other pictures than the second picture in a folder in which the second picture is located; and sends the URI of the second picture and the URI of the picture to be buffered to the media renderer, so that the media renderer acquires the second picture according to the URI of the second picture, and displays the second picture, and the media renderer acquires, according to the URI of the picture to be buffered, the picture to be buffered, and buffers the picture to be buffered.

At this time, the second picture selected by the user is not in the picture list. At this time, there may be two cases. The first case is that the second picture selected by the user and the first picture are in the same folder, but the second picture is not in the picture list at this time; the second case is that the second picture selected by the user and the first picture are not in the same folder.

Further, when the control point finds that the second picture selected by the user is not in the picture list, the control point sends a SetAVTransport URI( )action command to the media renderer, and performs a step of acquiring, according to the URI of the second picture, the URI of the picture to be buffered, and sending the URI of the second picture and the URI of the picture to be buffered to the media renderer, that is, performing the initial process repeatedly, so that the media renderer re-creates a picture list according to the URI that is sent at this time.

409. The media renderer receives the ninth control command sent by the control point, and views, according to the ninth control command, whether the next picture adjacent to the picture currently displayed in the picture list is buffered, and if the next picture is buffered, displays the next picture adjacent to the picture currently displayed in the picture list.

Correspondingly, in step 409, the ninth control command sent by the control point in step 4071 is received.

410. The media renderer receives the tenth control command sent by the control point, and displays, according to the tenth control command, whether the previous picture adjacent to the picture currently displayed in the picture list is buffered, and if the previous picture is buffered, displays the previous picture adjacent to the picture currently displayed in the picture list.

Correspondingly, in step 410, the tenth control command sent by the control point in step 4072 is received.

411. The media renderer receives the eleventh control command sent by the control point, where the eleventh control command carries the position of the second picture in the picture list, and views, according to the position, which is carried in the eleventh control command, of the second picture in the picture list, whether the second picture is buffered, and if the second picture is buffered, displays the second picture.

Correspondingly, in step 411, the eleventh control command sent by the control point in step 4073 is received.

412. The control point sends a thirteenth control command to the media renderer, where the thirteenth control command carries URIs of a preset quantity of adjacent pictures after a last picture in the picture list, so that the media renderer updates the picture list, and acquires the preset quantity of pictures according to the URIs of the preset quantity of pictures, and buffers the preset quantity of pictures.

Specifically, the thirteenth control command sent by the control point to the media renderer is an AddNext( )action command.

413. The control point sends a fourteenth control command to the media renderer, where the fourteenth control command carries URIs of a preset quantity of adjacent pictures before a foremost picture in the picture list, so that the media renderer updates the picture list, and acquires the preset quantity of pictures according to the URIs of the preset quantity of pictures, and buffers the preset quantity of pictures.

Specifically, the fourteenth control command sent by the control point to the media renderer is an AddPrevious( )action command.

414. The media renderer receives the thirteenth control command sent by the control point, where the thirteenth control command carries the URIs of the preset quantity of adjacent pictures after the last picture in the picture list.

415. The media renderer updates the picture list according to the URIs of the preset quantity of pictures, and acquires and buffers the preset quantity of pictures.

Correspondingly, the media renderer receives the thirteenth control command that is sent by the control point in step 412, updates the picture list according to the control command, and acquires the picture to be buffered.

416. The media renderer receives the fourteenth control command sent by the control point, where the fourteenth control command carries the URIs of the preset quantity of adjacent pictures before the foremost picture in the picture list.

417. The media renderer updates the picture list according to the URIs of the preset quantity of pictures, and acquires and buffers the preset quantity of pictures.

Correspondingly, the media renderer receives the fourteenth control command that is sent by the control point in step 413, updates the picture list according to the control command, and acquires the picture to be buffered.

418. The media renderer receives the URI of the second picture and the URI of the picture to be buffered, where the picture to be buffered is the preset quantity of pictures adjacent to the second picture or another picture in a folder in which the second picture is located except the second picture.

Corresponding to step 408, when the second picture selected by the user and received by the control point is not in the picture list, the media renderer receives the URI of the second picture and the URI of the picture to be buffered, which are sent by the control point, are received again.

419. The media renderer acquires the second picture according to the URI of the second picture, and displays the second picture, and acquires, according to the URI of the picture to be buffered, the picture to be buffered, and buffers the picture to be buffered.

After the URI of the second picture and the URI of the picture to be buffered are received in step 418, the second picture is acquired according to the URI of the second picture, and displayed, and the picture to be buffered is acquired according to the URI of the picture to be buffered, and buffered.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

Embodiment 5

Figure 5A:
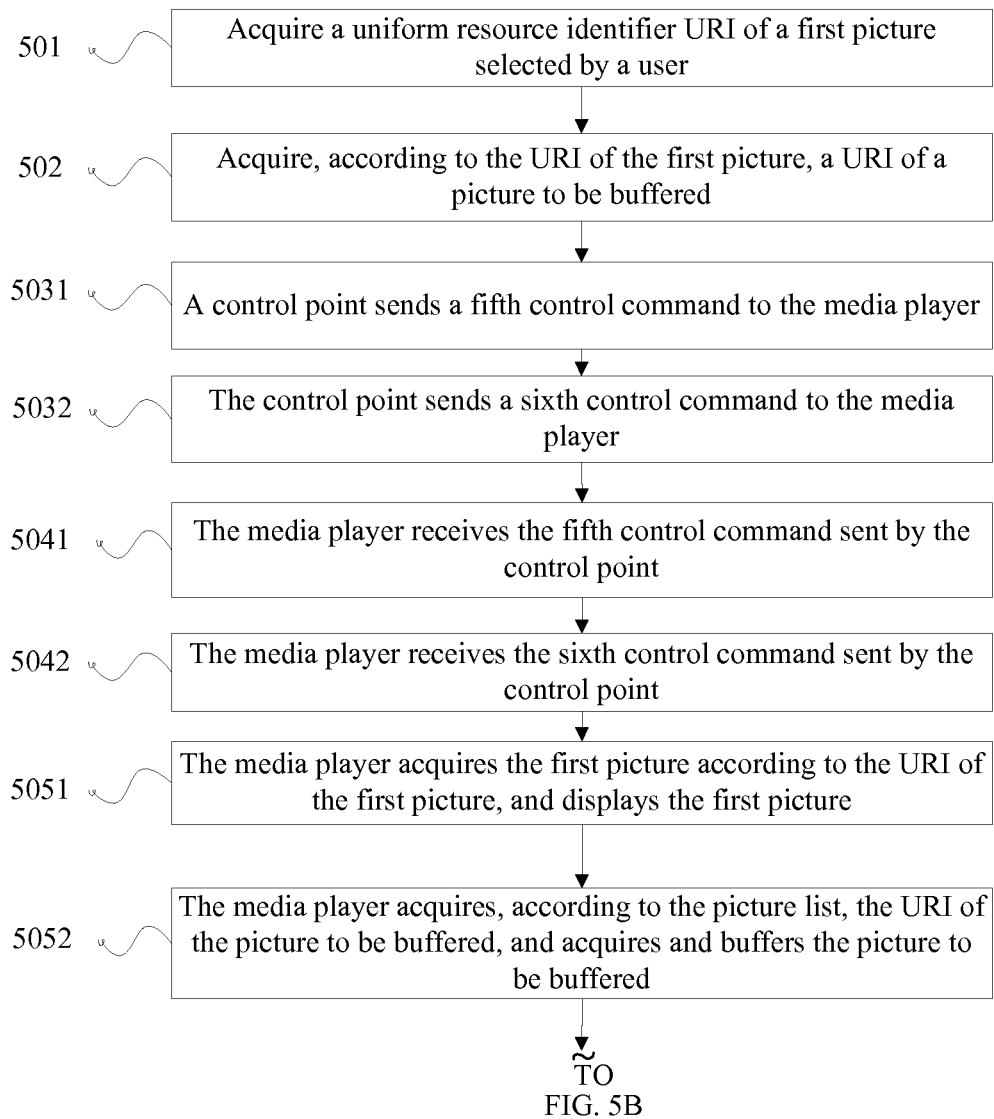
FIG. 5A and FIG. 5B are a flowchart of an embodiment method for displaying a picture according to Embodiment 5 of the present invention.
Figure 5B:
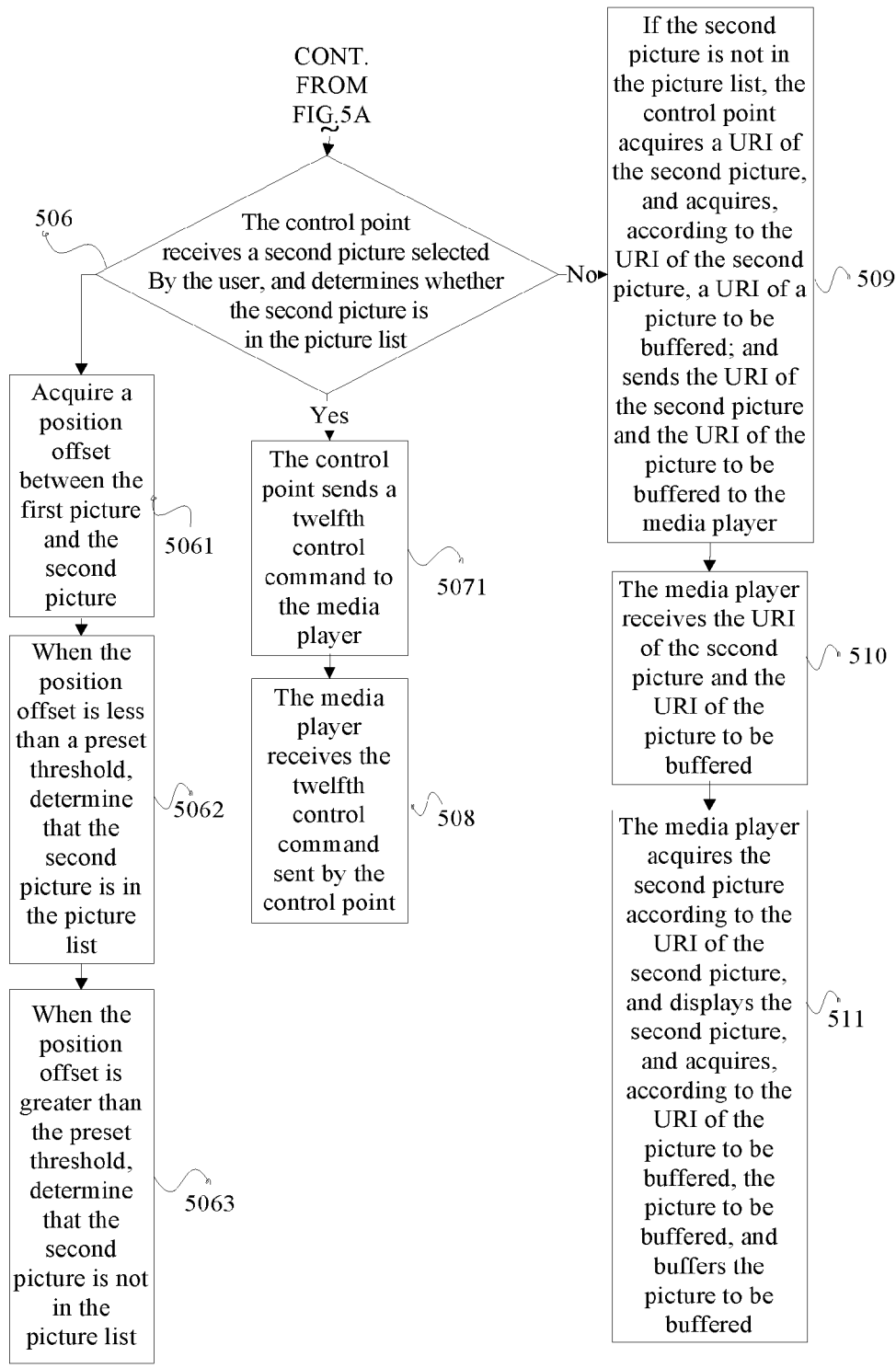

Referring to FIG. 5A and FIG. 5B, an embodiment of the present invention provides a method for displaying a picture. It should be noted that the embodiment of the present invention is an improvement of Embodiment 1 and Embodiment 2. Description in a part of steps in the embodiment of the present invention is the same as description in the corresponding steps in Embodiment 3, and no further description is provided herein.

A procedure of the method includes:

501. Acquire a uniform resource identifier URI of a first picture selected by a user.

502. Acquire, according to the URI of the first picture, a URI of a picture to be buffered, where the picture to be buffered is a preset quantity of pictures adjacent to the first picture or another picture in a folder in which the first picture is located except the first picture.

503. Send the URI of the first picture and the URI of the picture to be buffered to a media renderer, so that the media renderer acquires the first picture according to the URI of the first picture, and displays the first picture, and acquires, according to the URI of the picture to be buffered, the picture to be buffered, and buffers the picture to be buffered.

Sending the URI of the first picture and the URI of the picture to be buffered may be divided into two steps, and therefore, step 503 includes 5031 and 5032, which are specifically as follows:

5031. A control point sends a fifth control command to the media renderer, where the fifth control command carries the URI of the first picture, so that the media renderer acquires the first picture according to the URI of the first picture, and displays the first picture.

Specifically, the control point sends the URI of the first picture to the media renderer by invoking SetAVTransportURI( ) action.

5032. The control point sends a sixth control command to the media renderer, where the sixth control command carries a picture list, where the picture list includes the URI of the picture to be buffered, so that the media renderer acquires, according to the picture list, the picture to be buffered, and buffers the picture to be buffered.

Specifically, the control point sends the picture list to the media renderer by invoking SetNextAVTransportURI( ) action, where the picture list includes the URI of the picture to be buffered.

504. The media renderer receives the URI of the first picture and the URI of the picture to be buffered, which are sent by the control point, where the picture to be buffered is the preset quantity of pictures adjacent to the first picture or another picture in a folder in which the first picture is located except the first picture. Step 504 includes step 5041 and step 5042, which are specifically as follows:

5041. The media renderer receives the fifth control command sent by the control point, where the fifth control command carries the URI of the first picture.

5042. The media renderer receives the sixth control command sent by the control point, where the sixth control command carries the picture list, where the picture list includes the URI of the picture to be buffered.

505. The media renderer acquires the first picture according to the URI of the first picture, and displays the first picture, and acquires, according to the URI of the picture to be buffered, the picture to be buffered, and buffers the picture to be buffered.

Correspondingly, after the URI of the first picture and the picture list, which are sent by the control point to the media renderer in steps 5031 and 5032, are received, step 505 includes 5051 and 5052, which are specifically as follows:

5051. The media renderer acquires the first picture according to the URI of the first picture, and displays the first picture.

5052. The media renderer acquires, according to the picture list, the URI of the picture to be buffered, and acquires and buffers the picture to be buffered.

506. The control point receives a second picture selected by the user, and determines whether the second picture is in the picture list.

The second picture is a picture that is reselected by the user after the first picture is selected, and needs to be displayed on the media renderer.

Preferably, when whether the second picture is in the picture list is determined, a counter n may be set in the control point, where an initial value of n is 0. At this time, an offset between the first picture initially selected by the user and the second picture is counted. This manner is an optional step.

When next( ) action is sent to the media renderer, 1 is added to the counter, that is, n=n+1; when previous( ) action is sent to the media renderer, 1 is subtracted from the counter, that is, n=n−1; when seek( )action is sent to the media renderer, corresponding k is added to or subtracted from the counter according to an offset position change of a target picture in seek( )action, that is, n=n+k/n−k. A threshold a is preset, and its function is to determine whether |n| exceeds the threshold. If |n|>=a, the control point creates a new playlist, and sends the new playlist to the media renderer; and if |n|<<a, the media renderer continues to receive a next control command, and performs, according to the next control command, counting and operations after the counting. Further, when the picture to be buffered is all other files in the folder in which the first picture is located, it is unnecessary to perform the offset calculation process in this step.

Therefore, step 506 further includes step 5061 to step 5063, which are specifically as follows:

5061. Acquire a position offset between the first picture and the second picture.

5062. When the position offset is less than a preset threshold, determine that the second picture is in the picture list.

5063. When the position offset is greater than the preset threshold, determine that the second picture is not in the picture list.

507. If the second picture is in the picture list, the control point sends a control command to the media renderer according to a position of the second picture in the picture list, so that the media renderer displays the second picture according to the control command.

Specifically, when the second picture is in the picture list, the control command is sent to the media renderer according to the position of the second picture in the picture list. A difference between this step and Embodiment 2 lies in that: when the user selects the second picture, it is determined that the second picture is in the picture list, and all commands for displaying the second picture, which are sent to the media renderer, are seek( )action, where each command carries the position of the second picture in the picture list.

Therefore, step 507 includes 5071, which is specifically as follows:

5071. The control point sends a twelfth control command to the media renderer, where the twelfth control command carries the position of the second picture in the picture list, so that the media renderer displays the second picture according to the position of the second picture in the picture list.

At this time, the twelfth control command sent by the control point to the media renderer is a seek( )action command, where the seek( )action command carries the position of the second picture in the picture list.

508. The media renderer receives the twelfth control command sent by the control point, where the twelfth control command carries the position of the second picture in the picture list, and views, according to the position, which is carried in the twelfth control command, of the second picture in the picture list, whether the second picture is buffered, and if the second picture is buffered, displays the second picture.

Correspondingly, in step 508, the twelfth control command sent by the control point in step 5071 is received.

509. If the second picture is not in the picture list, the control point acquires a URI of the second picture, and acquires, according to the URI of the second picture, a URI of a picture to be buffered, where the picture to be buffered is a preset quantity of pictures adjacent to the second picture or other pictures than the second picture in a folder in which the second picture is located; and sends the URI of the second picture and the URI of the picture to be buffered to the media renderer, so that the media renderer acquires the second picture according to the URI of the second picture, and displays the second picture, and the media renderer acquires, according to the URI of the picture to be buffered, the picture to be buffered, and buffers the picture to be buffered.

510. The media renderer receives the URI of the second picture and the URI of the picture to be buffered, where the picture to be buffered is the preset quantity of pictures adjacent to the first picture or another picture in a folder in which the first picture is located except the first picture.

511. The media renderer acquires the second picture according to the URI of the second picture, and displays the second picture, and acquires, according to the URI of the picture to be buffered, the picture to be buffered, and buffers the picture to be buffered.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

Embodiment 6

Figure 6A:
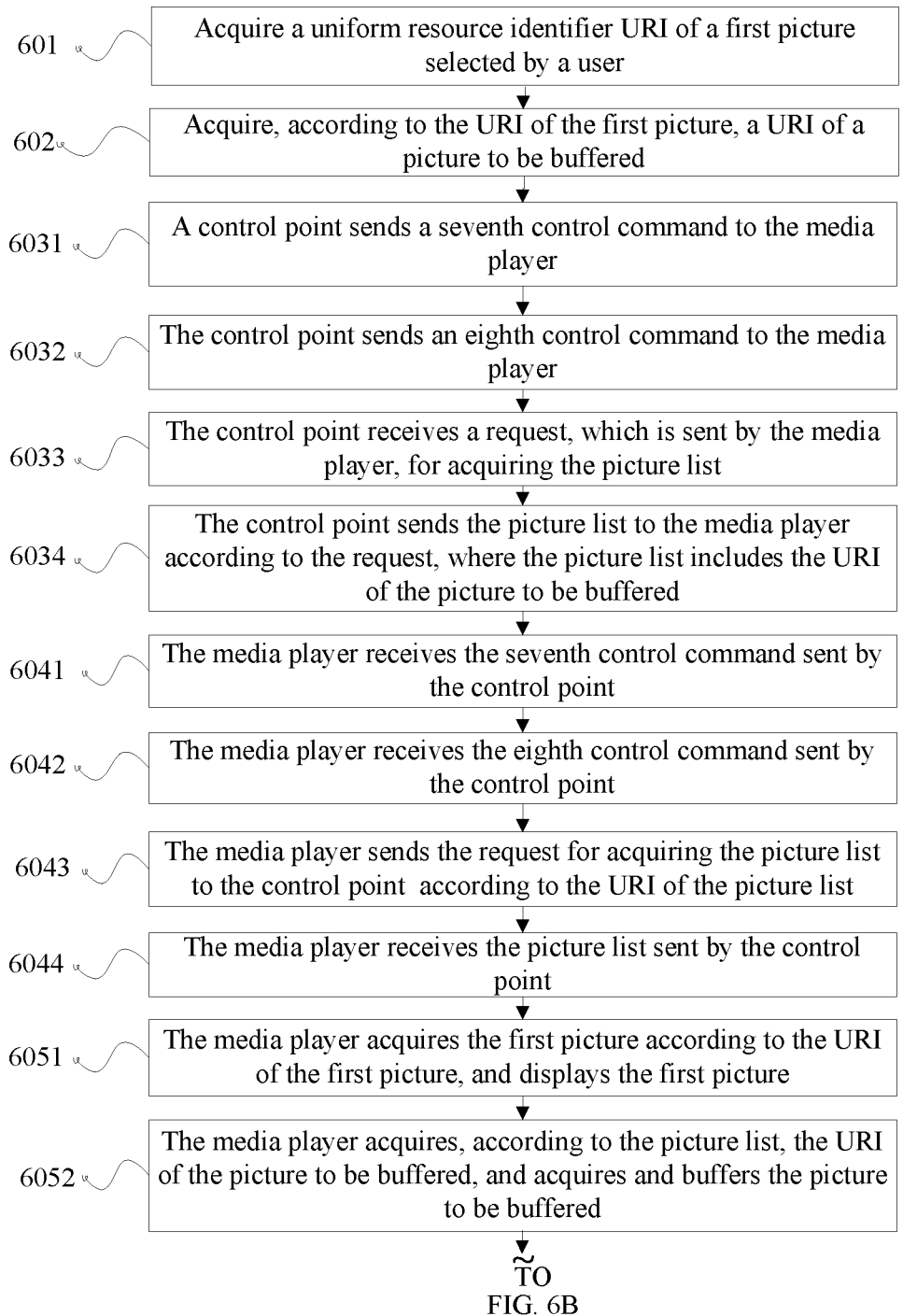
FIG. 6A and FIG. 6B are a flowchart of an embodiment method for displaying a picture according to Embodiment 6 of the present invention.
Figure 6B:
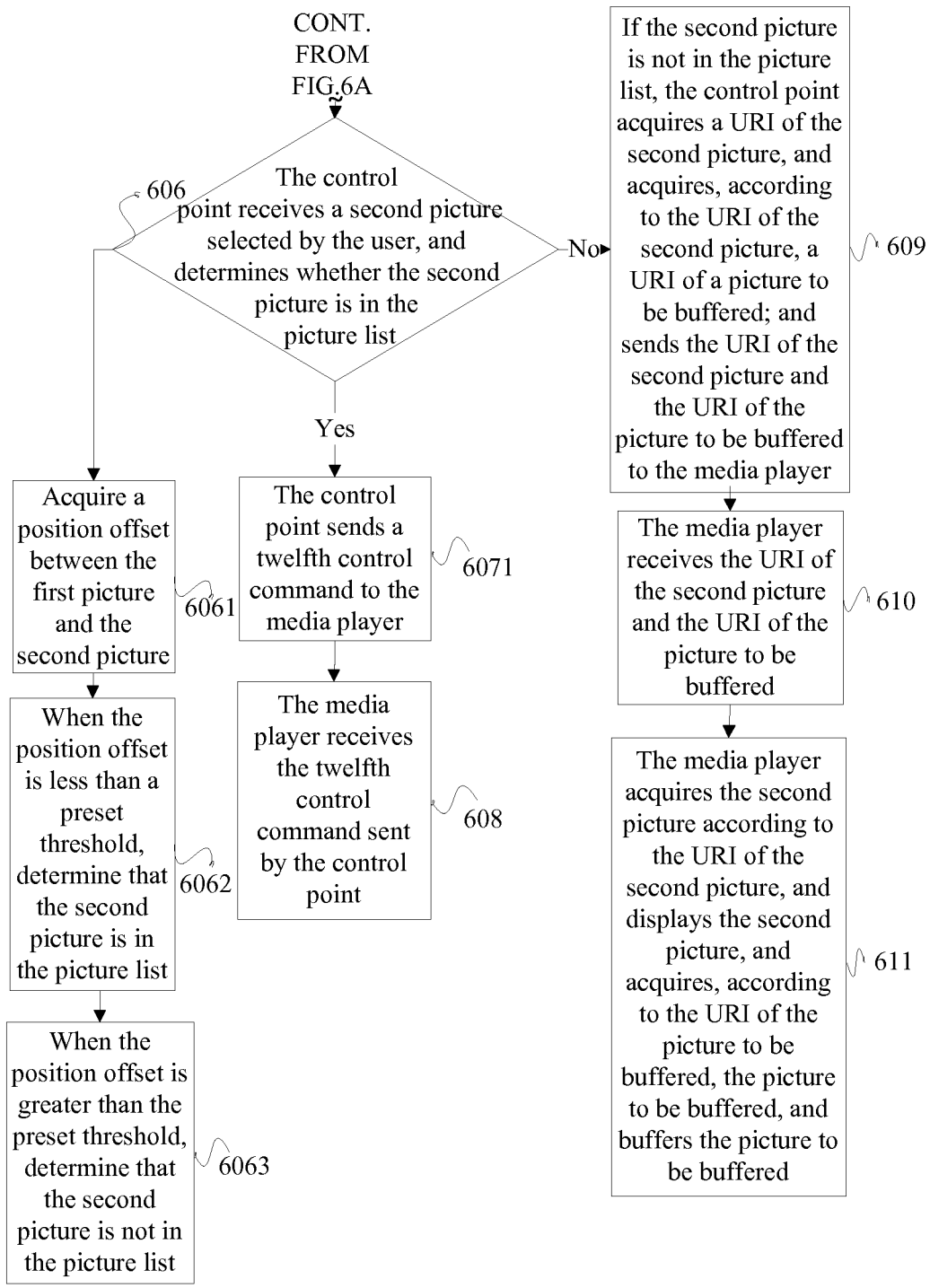

Referring to FIG. 6A and FIG. 6B, an embodiment of the present invention provides a method for displaying a picture. It should be noted that the embodiment of the present invention is an improvement of Embodiment 1 and Embodiment 2. Description in a part of steps in the embodiment of the present invention is the same as description in the corresponding steps in Embodiment 3, and no further description is provided herein.

A procedure of the method includes:

601. Acquire a uniform resource identifier URI of a first picture selected by a user.

602. Acquire, according to the URI of the first picture, a URI of a picture to be buffered, where the picture to be buffered is a preset quantity of pictures adjacent to the first picture or another picture in a folder in which the first picture is located except the first picture.

603. Send the URI of the first picture and the URI of the picture to be buffered to a media renderer, so that the media renderer acquires the first picture according to the URI of the first picture, and displays the first picture, and acquires, according to the URI of the picture to be buffered, the picture to be buffered, and buffers the picture to be buffered.

Sending the URI of the first picture and the URI of the picture to be buffered may be divided into four steps, and therefore, step 603 includes 6031 to 6034, which are specifically as follows:

6031. A control point sends a seventh control command to the media renderer, where the seventh control command carries the URI of the first picture, so that the media renderer acquires the first picture according to the URI of the first picture, and displays the first picture.

Specifically, the control point sends the URI of the first picture to the media renderer by invoking SetAVTransportURI( ) action.

6032. The control point sends an eighth control command to the media renderer, where the eighth control command carries a URI of a picture list.

Specifically, the control point sends the URI of the picture list to the media renderer by invoking SetNextAVTransportURI( ) action. In the embodiment of the present invention, the control point does not directly send a picture list that carries the URI of the picture to be buffered to the media renderer, but sends the URI of the picture list which is stored in the control point, so that after acquiring the URI of the picture list, the media renderer sends a request for acquiring the picture list to the control point.

6033. The control point receives a request, which is sent by the media renderer, for acquiring the picture list, where the request carries the URI of the picture list.

The media renderer sends the request for acquiring the picture list to the control point by using HTTP GET.

6034. The control point sends the picture list to the media renderer according to the request, where the picture list includes the URI of the picture to be buffered, so that the media renderer acquires, according to the picture list, the picture to be buffered, and buffers the picture to be buffered.

604. The media renderer receives the URI of the first picture and the URI of the picture to be buffered, which are sent by the control point, where the picture to be buffered is the preset quantity of pictures adjacent to the first picture or another picture in a folder in which the first picture is located except the first picture. Step 604 includes 6041 to 6044, which are specifically as follows:

6041. The media renderer receives the seventh control command sent by the control point, where the seventh control command carries the URI of the first picture.

6042. The media renderer receives the eighth control command sent by the control point, where the eighth control command carries the URI of the picture list.

6043. The media renderer sends the request for acquiring the picture list to the control point according to the URI of the picture list.

6044. The media renderer receives the picture list sent by the control point, where the picture list includes the URI of the picture to be buffered.

605. The media renderer acquires the first picture according to the URI of the first picture, and displays the first picture, and acquires, according to the URI of the picture to be buffered, the picture to be buffered, and buffers the picture to be buffered.

Correspondingly, after the URI of the first picture and the picture list, which are sent by the control point to the media renderer in steps 6031 to 6034, are received, step 605 includes 6051 and 6052, which are specifically as follows:

6051. The media renderer acquires the first picture according to the URI of the first picture, and displays the first picture.

6052. The media renderer acquires, according to the picture list, the URI of the picture to be buffered, and acquires and buffers the picture to be buffered.

606. The control point receives a second picture selected by the user, and determines whether the second picture is in the picture list.

The second picture is a picture that is reselected by the user after the first picture is selected, and needs to be displayed on the media renderer.

Preferably, when whether the second picture is in the picture list is determined, a counter n may be set in the control point, where an initial value of n is 0. At this time, an offset between the first picture initially selected by the user and the second picture is counted. This manner is an optional step.

When next( ) action is sent to the media renderer, 1 is added to the counter, that is, n=n+1; when previous( ) action is sent to the media renderer, 1 is subtracted from the counter, that is, n=n−1; when seek( )action is sent to the media renderer, corresponding k is added to or subtracted from the counter according to an offset position change of a target picture in seek( )action, that is, n=n+k/n−k. A threshold a is preset, and its function is to determine whether |n| exceeds the threshold. If |n|>=a, the control point creates a new playlist, and sends the new playlist to the media renderer; and if |n|<a, the media renderer continues to receive a next control command, and performs, according to the next control command, counting and operations after the counting. Further, when the picture to be buffered is all other files in the folder in which the first picture is located, it is unnecessary to perform the offset calculation process in this step.

Therefore, step 606 further includes step 6061 to step 6063, which are specifically as follows:

6061. Acquire a position offset between the first picture and the second picture.

6062. When the position offset is less than a preset threshold, determine that the second picture is in the picture list.

6063. When the position offset is greater than the preset threshold, determine that the second picture is not in the picture list.

607. If the second picture is in the picture list, the control point sends a control command to the media renderer according to a position of the second picture in the picture list, so that the media renderer displays the second picture according to the control command.

Specifically, when the second picture is in the picture list, the control command is sent to the media renderer according to the position of the second picture in the picture list. A difference between this step and Embodiment 2 lies in that: when the user selects the second picture, it is determined that the second picture is in the picture list, and all commands for displaying the second picture, which are sent to the media renderer, are seek( )action, where each command carries the position of the second picture in the picture list.

Therefore, step 607 includes step 6071, which is specifically as follows:

6071. The control point sends a twelfth control command to the media renderer, where the twelfth control command carries the position of the second picture in the picture list, so that the media renderer displays the second picture according to the position of the second picture in the picture list.

At this time, the twelfth control command sent by the control point to the media renderer is a seek( )action command, where the seek( )action command carries the position of the second picture in the picture list.

608. The media renderer receives the twelfth control command sent by the control point, where the twelfth control command carries the position of the second picture in the picture list, and views, according to the position, which is carried in the twelfth control command, of the second picture in the picture list, whether the second picture is buffered, and if the second picture is buffered, displays the second picture.

Correspondingly, in step 608, the twelfth control command sent by the control point in step 6071 is received.

609. If the second picture is not in the picture list, the control point acquires a URI of the second picture, and acquires, according to the URI of the second picture, a URI of a picture to be buffered, where the picture to be buffered is a preset quantity of pictures adjacent to the second picture or other pictures than the second picture in a folder in which the second picture is located; and sends the URI of the second picture and the URI of the picture to be buffered to the media renderer, so that the media renderer acquires the second picture according to the URI of the second picture, and displays the second picture, and the media renderer acquires, according to the URI of the picture to be buffered, the picture to be buffered, and buffers the picture to be buffered.

610. The media renderer receives the URI of the second picture and the URI of the picture to be buffered, where the picture to be buffered is the preset quantity of pictures adjacent to the second picture or another picture in a folder in which the second picture is located except the second picture.

611. The media renderer acquires the second picture according to the URI of the second picture, and displays the second picture, and acquires, according to the URI of the picture to be buffered, the picture to be buffered, and buffers the picture to be buffered.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

Embodiment 7

Figure 7:
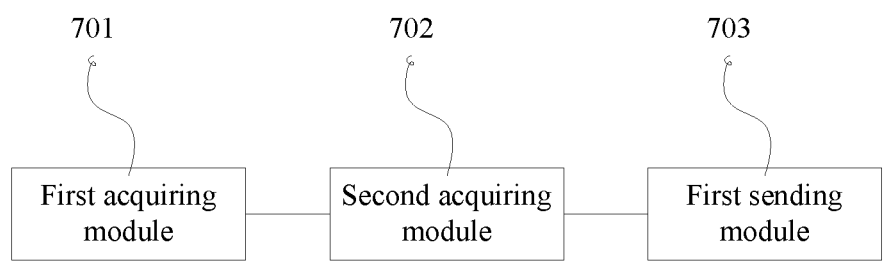
FIG. 7 is a schematic structural diagram of an embodiment control point for displaying a picture according to Embodiment 7 of the present invention.

Referring to FIG. 7, an embodiment of the present invention provides a control point for displaying a picture.

The control point includes:

a first acquiring module 701, configured to acquire a uniform resource identifier URI of a first picture selected by a user;

a second acquiring module 702, configured to acquire, according to the URI of the first picture, a URI of a picture to be buffered, where the picture to be buffered is a preset quantity of pictures adjacent to the first picture or another picture in a folder in which the first picture is located except the first picture; and a first sending module 703, configured to send the URI of the first picture and the URI of the picture to be buffered to a media renderer, so that the media renderer acquires the first picture according to the URI of the first picture, and displays the first picture, and acquires, according to the URI of the picture to be buffered, the picture to be buffered, and buffers the picture to be buffered.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

Embodiment 8

Figure 8:
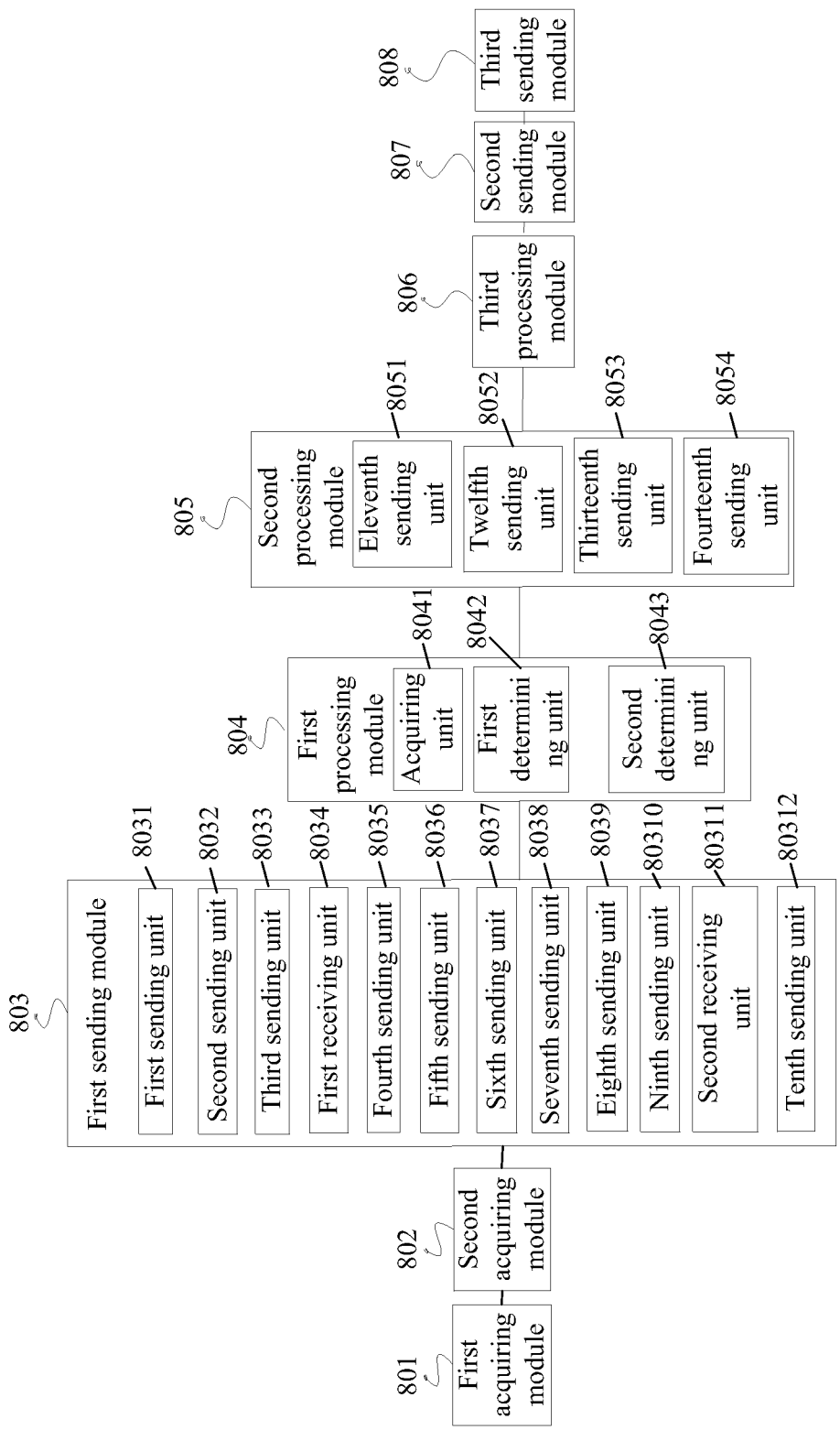
FIG. 8 is a schematic structural diagram of an embodiment control point for displaying a picture according to Embodiment 8 of the present invention.

Referring to FIG. 8, an embodiment of the present invention provides a control point for displaying a picture.

The control point includes:

a first acquiring module 801, configured to acquire a uniform resource identifier URI of a first picture selected by a user;

a second acquiring module 802, configured to acquire, according to the URI of the first picture, a URI of a picture to be buffered, where the picture to be buffered is a preset quantity of pictures adjacent to the first picture or another picture in a folder in which the first picture is located except the first picture; and a first sending module 803, configured to send the URI of the first picture and the URI of the picture to be buffered to a media renderer, so that the media renderer acquires the first picture according to the URI of the first picture, and displays the first picture, and acquires, according to the URI of the picture to be buffered, the picture to be buffered, and buffers the picture to be buffered.

In a specific implementation manner, the first sending module 803 includes:

a first sending unit 8031, configured to send a first control command to the media renderer, where the first control command carries a picture list, where the picture list includes the URI of the first picture and the URI of the picture to be buffered; and a second sending unit 8032, configured to send a second control command to the media renderer, where the second control command carries a position of the first picture in the picture list, so that the media renderer acquires the first picture according to the position of the first picture in the picture list and the picture list, and displays the first picture, and acquires and buffers the picture to be buffered.

Alternatively, the first sending module 803 includes:

a third sending unit 8033, configured to send a third control command to the media renderer, where the third control command carries a URI of a picture list;

a first receiving unit 8034, configured to receive a request, which is sent by the media renderer, for acquiring the picture list, where the request carries the URI of the picture list;

a fourth sending unit 8035, configured to send the picture list to the media renderer according to the request, where the picture list includes the URI of the first picture and the URI of the picture to be buffered; and a fifth sending unit 8036, configured to send a fourth control command to the media renderer, where the fourth control command carries a position of the first picture in the picture list, so that the media renderer acquires the first picture according to the position of the first picture in the picture list and the picture list, and displays the first picture, and acquires and buffers the picture to be buffered.

Alternatively, the first sending module 803 includes:

a sixth sending unit 8037, configured to send a fifth control command to the media renderer, where the fifth control command carries the URI of the first picture, so that the media renderer acquires the first picture according to the URI of the first picture, and displays the first picture; and a seventh sending unit 8038, configured to send a sixth control command to the media renderer, where the sixth control command carries a picture list, where the picture list includes the URI of the picture to be buffered, so that the media renderer acquires, according to the picture list, the picture to be buffered, and buffers the picture to be buffered.

Alternatively, the first sending module 803 includes:

an eighth sending unit 8039, configured to send a seventh control command to the media renderer, where the seventh control command carries the URI of the first picture, so that the media renderer acquires the first picture according to the URI of the first picture, and displays the first picture;

a ninth sending unit 80310, configured to send an eighth control command to the media renderer, where the eighth control command carries a URI of a picture list;

a second receiving unit 80311, configured to receive a request, which is sent by the media renderer, for acquiring the picture list, where the request carries the URI of the picture list; and a tenth sending unit 80312, configured to send the picture list to the media renderer according to the request, where the picture list includes the URI of the picture to be buffered, so that the media renderer acquires, according to the picture list, the picture to be buffered, and buffers the picture to be buffered.

Preferably, the control point further includes:

a first processing module 804, configured to receive a second picture selected by the user, and determine whether the second picture is in the picture list;

a second processing module 805, configured to: if the second picture is in the picture list, send a control command to the media renderer according to a position of the second picture in the picture list, so that the media renderer displays the second picture according to the control command; and a third processing module 806, configured to: if the second picture is not in the picture list, acquire a URI of the second picture, and acquire, according to the URI of the second picture, a URI of a picture to be buffered, where the picture to be buffered is a preset quantity of pictures adjacent to the second picture or other pictures than the second picture in a folder in which the second picture is located; and send the URI of the second picture and the URI of the picture to be buffered to the media renderer, so that the media renderer acquires the second picture according to the URI of the second picture, and displays the second picture, and the media renderer acquires, according to the URI of the picture to be buffered, the picture to be buffered, and buffers the picture to be buffered.

Preferably, the first processing module 804 further includes:

an acquiring unit 8041, configured to acquire a position offset between the first picture and the second picture;

a first determining unit 8042, configured to: when the position offset is less than a preset threshold, determine that the second picture is in the picture list; and a second determining unit 8043, configured to: when the position offset is greater than the preset threshold, determine that the second picture is not in the picture list.

Preferably, the second processing module 805 includes:

an eleventh sending unit 8051, configured to: when the second picture is a next picture, adjacent to a picture that is currently displayed by the media renderer, in the picture list, send a ninth control command to the media renderer, so that the media renderer displays the next picture adjacent to the picture that is currently displayed by the media renderer;

a twelfth sending unit 8052, configured to: when the second picture is a previous picture, adjacent to the picture that is currently displayed by the media renderer, in the picture list, send a tenth control command to the media renderer, so that the media renderer displays the previous picture adjacent to the picture that is currently displayed by the media renderer; and a thirteenth sending unit 8053, configured to: when the second picture is another picture, except the next picture and previous picture adjacent to the picture that is currently displayed by the media renderer, in the picture list, send an eleventh control command to the media renderer, where the eleventh control command carries the position of the second picture in the picture list, so that the media renderer displays the second picture according to the position of the second picture in the picture list.

Alternatively, the second processing module 805 includes:

a fourteenth sending unit 8054, configured to send a twelfth control command to the media renderer, where the twelfth control command carries the position of the second picture in the picture list, so that the media renderer displays the second picture according to the position of the second picture in the picture list.

Preferably, the control point further includes:

a second sending module 807, configured to send a thirteenth control command to the media renderer, where the thirteenth control command carries URIs of a preset quantity of adjacent pictures after a last picture in the picture list, so that the media renderer updates the picture list, and acquires the preset quantity of pictures according to the URIs of the preset quantity of pictures, and buffers the preset quantity of pictures.

Preferably, the control point further includes:

a third sending module 808, configured to send a fourteenth control command to the media renderer, where the fourteenth control command carries URIs of a preset quantity of adjacent pictures before a foremost picture in the picture list, so that the media renderer updates the picture list, and acquires the preset quantity of pictures according to the URIs of the preset quantity of pictures, and buffers the preset quantity of pictures.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

Embodiment 9

Figure 9:
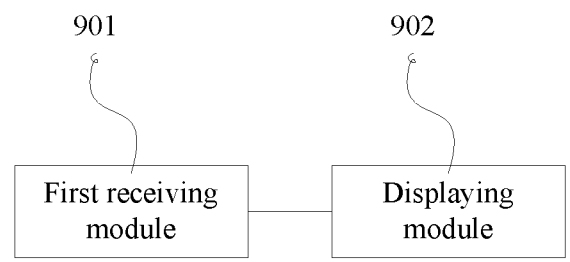
FIG. 9 is a schematic structural diagram of an embodiment media renderer for displaying a picture according to Embodiment 9 of the present invention.

Referring to FIG. 9, an embodiment of the present invention provides a media renderer for displaying a picture.

The media renderer includes:

a first receiving module 901, configured to receive a URI of a first picture and a URI of a picture to be buffered, which are sent by a control point, where the picture to be buffered is a preset quantity of pictures adjacent to the first picture or another picture in a folder in which the first picture is located except the first picture; and a displaying module 902, configured to acquire the first picture according to the URI of the first picture, and display the first picture, and acquire, according to the URI of the picture to be buffered, the picture to be buffered, and buffer the picture to be buffered.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

Embodiment 10

Figure 10:
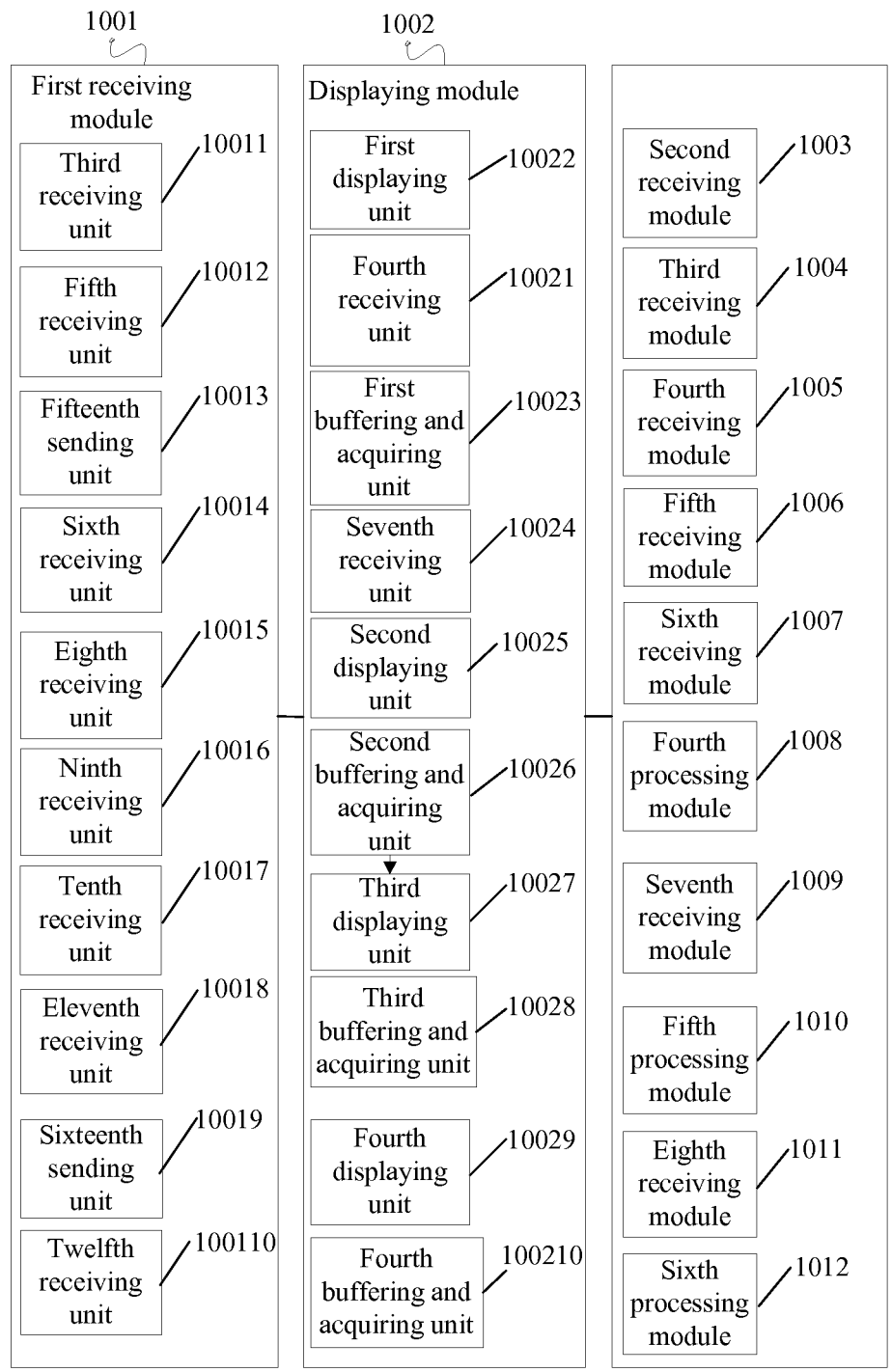
FIG. 10 is a schematic structural diagram of an embodiment media renderer for displaying a picture according to Embodiment 10 of the present invention.

Referring to FIG. 10, an embodiment of the present invention provides a media renderer for displaying a picture.

The media renderer includes:

a first receiving module 1001, configured to receive a URI of a first picture and a URI of a picture to be buffered, which are sent by a control point, where the picture to be buffered is a preset quantity of pictures adjacent to the first picture or another picture in a folder in which the first picture is located except the first picture; and a displaying module 1002, configured to acquire the first picture according to the URI of the first picture, and display the first picture, and acquire, according to the URI of the picture to be buffered, the picture to be buffered, and buffer the picture to be buffered.

In a specific implementation manner, the first receiving module 1001 includes:

a third receiving unit 10011, configured to receive a first control command sent by the control point, where the first control command carries a picture list, where the picture list includes the URI of the first picture and the URI of the picture to be buffered.

Correspondingly, the displaying module 1002 includes:

a fourth receiving unit 10021, configured to receive a second control command sent by the control point, where the second control command carries a position of the first picture in the picture list;

a first displaying unit 10022, configured to acquire, from the picture list according to the position of the first picture in the picture list, the URI of the first picture and the URI of the picture to be buffered; and a first buffering and acquiring unit 10023, configured to acquire the first picture according to the URI of the first picture, and display the first picture, and acquire, according to the URI of the picture to be buffered, the picture to be buffered, and buffer the picture to be buffered.

Alternatively, the first receiving module 1001 includes:

a fifth receiving unit 10012, configured to receive a third control command sent by the control point, where the third control command carries a URI of a picture list;

a fifteenth sending unit 10013, configured to send a request for acquiring the picture list to the control point according to the URI of the picture list; and a sixth receiving unit 10014, configured to receive the picture list sent by the control point, where the picture list includes the URI of the first picture and the URI of the picture to be buffered.

Correspondingly, the displaying module 1002 includes:

a seventh receiving unit 10024, configured to receive a fourth control command sent by the control point, where the fourth control command carries a position of the first picture in the picture list;

a second displaying unit 10025, configured to acquire, from the picture list according to the position of the first picture in the picture list, the URI of the first picture and the URI of the picture to be buffered; and a second buffering and acquiring unit 10026, configured to acquire the first picture according to the URI of the first picture, and display the first picture, and acquire, according to the URI of the picture to be buffered, the picture to be buffered, and buffer the picture to be buffered.

Alternatively, the first receiving module 1001 further includes:

an eighth receiving unit 10015, configured to receive a fifth control command sent by the control point, where the fifth control command carries the URI of the first picture; and a ninth receiving unit 10016, configured to receive a sixth control command sent by the control point, where the sixth control command carries a picture list, where the picture list includes the URI of the picture to be buffered.

Correspondingly, the displaying module 1002 includes:

a third displaying unit 10027, configured to acquire the first picture according to the URI of the first picture, and display the first picture; and a third buffering and acquiring unit 10028, configured to acquire, according to the picture list, the URI of the picture to be buffered, and acquire and buffer the picture to be buffered.

In a specific implementation manner, the first receiving module 1001 includes:

a tenth receiving unit 10017, configured to receive a seventh control command sent by the control point, where the seventh control command carries the URI of the first picture;

an eleventh receiving unit 10018, configured to receive an eighth control command sent by the control point, where the eighth control command carries a URI of a picture list;

a sixteenth sending unit 10019, configured to send, to the control point according to the URI of the picture list, a request for acquiring the picture list; and a twelfth receiving unit 100110, configured to receive the picture list sent by the control point, where the picture list includes the URI of the picture to be buffered.

Correspondingly, the displaying module 1002 includes:

a fourth displaying unit 10029, configured to acquire the first picture according to the URI of the first picture, and display the first picture; and a fourth buffering and acquiring unit 100210, configured to acquire, according to the picture list, the URI of the picture to be buffered, and acquire and buffer the picture to be buffered.

Preferably, the media renderer further includes:

a second receiving module 1003, configured to receive a ninth control command sent by the control point, and view, according to the ninth control command, whether a next picture adjacent to a picture currently displayed in the picture list is buffered, and if the next picture is buffered, display the next picture adjacent to the picture currently displayed in the picture list;

a third receiving module 1004, configured to receive a tenth control command sent by the control point, and display, according to the tenth control command, whether a previous picture adjacent to the picture currently displayed in the picture list is buffered, and if the previous picture is buffered, display the previous picture adjacent to the picture currently displayed in the picture list; and a fourth receiving module 1005, configured to receive an eleventh control command sent by the control point, where the eleventh control command carries a position of a second picture in the picture list, and view, according to the position, which is carried in the eleventh control command, of the second picture in the picture list, whether the second picture is buffered, and if the second picture is buffered, display the second picture.

Alternatively, the media renderer further includes:

a fifth receiving module 1006, configured to receive a twelfth control command sent by the control point, where the twelfth control command carries a position of a second picture in the picture list, and view, according to the position, which is carried in the twelfth control command, of the second picture in the picture list, whether the second picture is buffered, and if the second picture is buffered, display the second picture.

Preferably, the media renderer further includes:

a sixth receiving module 1007, configured to receive a thirteenth control command sent by the control point, where the thirteenth control command carries URIs of a preset quantity of adjacent pictures after a last picture in the picture list; and a fourth processing module 1008, configured to update the picture list according to the URIs of the preset quantity of pictures, and acquire and buffer the preset quantity of pictures.

Preferably, the media renderer further includes:

a seventh receiving module 1009, configured to receive a fourteenth control command sent by the control point, where the fourteenth control command carries URIs of a preset quantity of adjacent pictures before a foremost picture in the picture list; and a fifth processing module 1010, configured to update the picture list according to the URIs of the preset quantity of pictures, and acquire and buffer the preset quantity of pictures.

Alternatively, the media renderer includes:

an eighth receiving module 1011, configured to receive a URI of a second picture and the URI of the picture to be buffered, where the picture to be buffered is the preset quantity of pictures adjacent to the second picture or another picture in a folder in which the second picture is located except the second picture; and a sixth processing module 1012, configured to acquire the second picture according to the URI of the second picture, and display the second picture, and acquire, according to the URI of the picture to be buffered, the picture to be buffered, and buffer the picture to be buffered.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

Embodiment 11

Figure 11:
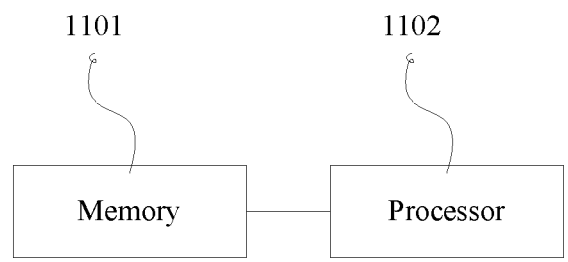
FIG. 11 is a schematic structural diagram of an embodiment control point for displaying a picture according to Embodiment 11 of the present invention.

Referring to FIG. 11, an embodiment of the present invention provides a control point for displaying a picture. The control point includes:

a memory 1101 and at least one processor 1102, where the processor 1102 is configured to execute the following operations:

acquiring a uniform resource identifier URI of a first picture selected by a user;

acquiring, according to the URI of the first picture, a URI of a picture to be buffered, where the picture to be buffered is a preset quantity of pictures adjacent to the first picture or another picture in a folder in which the first picture is located except the first picture; and sending the URI of the first picture and the URI of the picture to be buffered to a media renderer, so that the media renderer acquires the first picture according to the URI of the first picture, and displays the first picture, and acquires, according to the URI of the picture to be buffered, the picture to be buffered, and buffers the picture to be buffered.

The sending the URI of the first picture and the URI of the picture to be buffered to a media renderer includes:

sending a first control command to the media renderer, where the first control command carries a picture list, where the picture list includes the URI of the first picture and the URI of the picture to be buffered; and sending a second control command to the media renderer, where the second control command carries a position of the first picture in the picture list, so that the media renderer acquires the first picture according to the position of the first picture in the picture list and the picture list, and displays the first picture, and acquires and buffers the picture to be buffered.

The sending the URI of the first picture and the URI of the picture to be buffered to a media renderer includes:

sending a third control command to the media renderer, where the third control command carries a URI of a picture list;

receiving a request, which is sent by the media renderer, for acquiring the picture list, where the request carries the URI of the picture list;

sending the picture list to the media renderer according to the request, where the picture list includes the URI of the first picture and the URI of the picture to be buffered; and sending a fourth control command to the media renderer, where the fourth control command carries a position of the first picture in the picture list, so that the media renderer acquires the first picture according to the position of the first picture in the picture list and the picture list, and displays the first picture, and acquires and buffers the picture to be buffered.

The sending the URI of the first picture and the URI of the picture to be buffered to a media renderer includes:

sending a fifth control command to the media renderer, where the fifth control command carries the URI of the first picture, so that the media renderer acquires the first picture according to the URI of the first picture, and displays the first picture; and sending a sixth control command to the media renderer, where the sixth control command carries a picture list, where the picture list includes the URI of the picture to be buffered, so that the media renderer acquires, according to the picture list, the picture to be buffered, and buffers the picture to be buffered.

The sending the URI of the first picture and the URI of the picture to be buffered to a media renderer includes:

sending a seventh control command to the media renderer, where the seventh control command carries the URI of the first picture, so that the media renderer acquires the first picture according to the URI of the first picture, and displays the first picture;

sending an eighth control command to the media renderer, where the eighth control command carries a URI of a picture list;

receiving a request, which is sent by the media renderer, for acquiring the picture list, where the request carries the URI of the picture list; and sending the picture list to the media renderer according to the request, where the picture list includes the URI of the picture to be buffered, so that the media renderer acquires, according to the picture list, the picture to be buffered, and buffers the picture to be buffered.

After the sending the URI of the first picture and the URI of the picture to be buffered to a media renderer, the processor 1102 is further configured to execute the following operations:

receiving a second picture selected by the user, and determining whether the second picture is in the picture list;

if the second picture is in the picture list, sending a control command to the media renderer according to a position of the second picture in the picture list, so that the media renderer displays the second picture according to the control command; and if the second picture is not in the picture list, acquiring a URI of the second picture, and acquiring, according to the URI of the second picture, a URI of a picture to be buffered, where the picture to be buffered is a preset quantity of pictures adjacent to the second picture or other pictures than the second picture in a folder in which the second picture is located; and sending the URI of the second picture and the URI of the picture to be buffered to the media renderer, so that the media renderer acquires the second picture according to the URI of the second picture, and displays the second picture, and the media renderer acquires, according to the URI of the picture to be buffered, the picture to be buffered, and buffers the picture to be buffered.

The sending a corresponding control command to the media renderer according to a position of the second picture in the picture list includes:

when the second picture is a next picture, adjacent to a picture that is currently displayed by the media renderer, in the picture list, sending a ninth control command to the media renderer, so that the media renderer displays the next picture adjacent to the picture that is currently displayed by the media renderer; or when the second picture is a previous picture, adjacent to a picture that is currently displayed by the media renderer, in the picture list, sending a tenth control command to the media renderer, so that the media renderer displays the previous picture adjacent to the picture that is currently displayed by the media renderer; or when the second picture is another picture, except a next picture and a previous picture adjacent to a picture that is currently displayed by the media renderer, in the picture list, sending an eleventh control command to the media renderer, where the eleventh control command carries the position of the second picture in the picture list, so that the media renderer displays the second picture according to the position of the second picture in the picture list.

The sending a corresponding control command to the media renderer according to a position of the second picture in the picture list includes:

sending a twelfth control command to the media renderer, where the twelfth control command carries the position of the second picture in the picture list, so that the media renderer displays the second picture according to the position of the second picture in the picture list.

After the sending a ninth control command to the media renderer, the processor 1102 is further configured to execute the following operations:

sending a thirteenth control command to the media renderer, where the thirteenth control command carries URIs of a preset quantity of adjacent pictures after a last picture in the picture list, so that the media renderer updates the picture list, and acquires the preset quantity of pictures according to the URIs of the preset quantity of pictures, and buffers the preset quantity of pictures.

After the sending a tenth control command to the media renderer, the processor 1102 is further configured to execute the following operations:

sending a fourteenth control command to the media renderer, where the fourteenth control command carries URIs of a preset quantity of adjacent pictures before a foremost picture in the picture list, so that the media renderer updates the picture list, and acquires the preset quantity of pictures according to the URIs of the preset quantity of pictures, and buffers the preset quantity of pictures.

The determining whether the second picture is in the picture list includes:

acquiring a position offset between the first picture and the second picture;

when the position offset is less than a preset threshold, determining that the second picture is in the picture list; and when the position offset is greater than the preset threshold, determining that the second picture is not in the picture list.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

Embodiment 12

Figure 12:
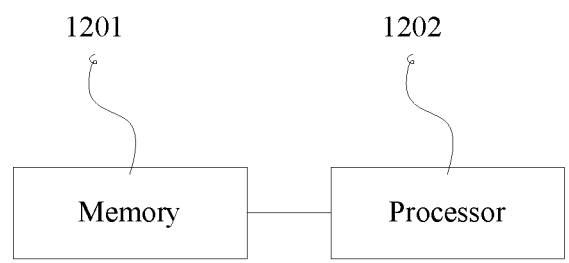
FIG. 12 is a schematic structural diagram of an embodiment media renderer for displaying a picture according to Embodiment 12 of the present invention.

Referring to FIG. 12, an embodiment of the present invention provides a media renderer for displaying a picture. The media renderer includes:

a memory 1201 and at least one processor 1202, where the processor 1202 is configured to execute the following operations of displaying a picture:

receiving a URI of a first picture and a URI of a picture to be buffered, which are sent by a control point, where the picture to be buffered is a preset quantity of pictures adjacent to the first picture or another picture in a folder in which the first picture is located except the first picture; and acquiring the first picture according to the URI of the first picture, and displaying the first picture, and acquiring, according to the URI of the picture to be buffered, the picture to be buffered, and buffering the picture to be buffered.

The receiving a URI of a first picture and a URI of a picture to be buffered, which are sent by a control point includes:

receiving a first control command sent by the control point, where the first control command carries a picture list, where the picture list includes the URI of the first picture and the URI of the picture to be buffered.

The acquiring the first picture according to the URI of the first picture, and displaying the first picture, and acquiring, according to the URI of the picture to be buffered, the picture to be buffered, and buffering the picture to be buffered include:

receiving a second control command sent by the control point, where the second control command carries a position of the first picture in the picture list;

acquiring, from the picture list according to the position of the first picture in the picture list, the URI of the first picture and the URI of the picture to be buffered; and acquiring the first picture according to the URI of the first picture, and displaying the first picture, and acquiring, according to the URI of the picture to be buffered, the picture to be buffered, and buffering the picture to be buffered.

The receiving a URI of a first picture and a URI of a picture to be buffered, which are sent by a control point includes:

receiving a third control command sent by the control point, where the third control command carries a URI of a picture list;

sending a request for acquiring the picture list to the control point according to the URI of the picture list; and receiving the picture list sent by the control point, where the picture list includes the URI of the first picture and the URI of the picture to be buffered.

The acquiring the first picture according to the URI of the first picture, and displaying the first picture, and acquiring, according to the URI of the picture to be buffered, the picture to be buffered, and buffering the picture to be buffered include:

receiving a fourth control command sent by the control point, where the fourth control command carries a position of the first picture in the picture list;

acquiring, from the picture list according to the position of the first picture in the picture list, the URI of the first picture and the URI of the picture to be buffered; and acquiring the first picture according to the URI of the first picture, and displaying the first picture, and acquiring, according to the URI of the picture to be buffered, the picture to be buffered, and buffering the picture to be buffered.

The receiving a URI of a first picture and a URI of a picture to be buffered, which are sent by a control point includes:

receiving a fifth control command sent by the control point, where the fifth control command carries the URI of the first picture; and receiving a sixth control command sent by the control point, where the sixth control command carries a picture list, where the picture list includes the URI of the picture to be buffered.

The acquiring the first picture according to the URI of the first picture, and displaying the first picture, and acquiring, according to the URI of the picture to be buffered, the picture to be buffered, and buffering the picture to be buffered include:

acquiring the first picture according to the URI of the first picture, and displaying the first picture; and acquiring, according to the picture list, the URI of the picture to be buffered, and acquiring and buffering the picture to be buffered.

The receiving a URI of a first picture and a URI of a picture to be buffered, which are sent by a control point includes:

receiving a seventh control command sent by the control point, where the seventh control command carries the URI of the first picture;

receiving an eighth control command sent by the control point, where the eighth control command carries a URI of a picture list;

sending a request for acquiring the picture list to the control point according to the URI of the picture list; and receiving the picture list sent by the control point, where the picture list includes the URI of the picture to be buffered.

The acquiring the first picture according to the URI of the first picture, and displaying the first picture, and acquiring, according to the URI of the picture to be buffered, the picture to be buffered, and buffering the picture to be buffered include:

acquiring the first picture according to the URI of the first picture, and displaying the first picture; and acquiring, according to the picture list, the URI of the picture to be buffered, and acquiring and buffering the picture to be buffered.

After the acquiring the first picture according to the URI of the first picture, and displaying the first picture, and acquiring, according to the URI of the picture to be buffered, the picture to be buffered, and buffering the picture to be buffered, the processor 1202 is further configured to execute the following operations:

receiving a ninth control command sent by the control point, and viewing, according to the ninth control command, whether a next picture adjacent to a picture currently displayed in the picture list is buffered, and if the next picture is buffered, displaying the next picture adjacent to the picture currently displayed in the picture list; or receiving a tenth control command sent by the control point, and viewing, according to the tenth control command, whether a previous picture adjacent to a picture currently displayed in the picture list is buffered, and if the previous picture is buffered, displaying the previous picture adjacent to the picture currently displayed in the picture list; or receiving an eleventh control command sent by the control point, where the eleventh control command carries a position of a second picture in the picture list, and viewing, according to the position, which is carried in the eleventh control command, of the second picture in the picture list, whether the second picture is buffered, and if the second picture is buffered, displaying the second picture.

After the acquiring the first picture according to the URI of the first picture, and displaying the first picture, and acquiring, according to the URI of the picture to be buffered, the picture to be buffered, and buffering the picture to be buffered, the processor 1202 is further configured to execute the following operations:

receiving a twelfth control command sent by the control point, where the twelfth control command carries a position of a second picture in the picture list, and viewing, according to the position, which is carried in the twelfth control command, of the second picture in the picture list, whether the second picture is buffered, and if the second picture is buffered, displaying the second picture.

After the displaying, according to the ninth control command, the next picture adjacent to the picture currently displayed in the picture list, the processor 1202 is further configured to execute the following operations:

receiving a thirteenth control command sent by the control point, where the thirteenth control command carries URIs of a preset quantity of adjacent pictures after a last picture in the picture list; and updating the picture list according to the URIs of the preset quantity of pictures, and acquiring and buffering the preset quantity of pictures.

After the displaying, according to the tenth control command, the previous picture adjacent to the picture currently displayed in the picture list, the processor 1202 is further configured to execute the following operations:

receiving a fourteenth control command sent by the control point, where the fourteenth control command carries URIs of a preset quantity of adjacent pictures before a foremost picture in the picture list; and updating the picture list according to the URIs of the preset quantity of pictures, and acquiring and buffering the preset quantity of pictures.

After the acquiring the first picture according to the URI of the first picture, and displaying the first picture, and acquiring, according to the URI of the picture to be buffered, the picture to be buffered, and buffering the picture to be buffered, the processor 1202 is further configured to execute the following operations:

receiving a URI of a second picture and the URI of the picture to be buffered, where the picture to be buffered is the preset quantity of pictures adjacent to the second picture or another picture in a folder in which the second picture is located except the second picture; and acquiring the second picture according to the URI of the second picture, and displaying the second picture, and acquiring, according to the URI of the picture to be buffered, the picture to be buffered, and buffering the picture to be buffered.

In the embodiment of the present invention, a URI of a picture to be buffered is determined according to a first picture selected by a user, and URI of the first picture used for displaying and the picture to be buffered are sent to a media renderer, so that when acquiring and displaying the first picture, the media renderer acquires and buffers the picture to be buffered. When the user switches the selected picture, displaying may be performed instantly according to the buffered picture, which improves efficiency of displaying pictures.

The sequence numbers of the foregoing embodiments of the present invention are only used for description, and do not represent preference of the embodiments.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the principle of the present invention shall fall within the protection scope of the present invention.

What is claimed is:

1. A method comprising:
    acquiring a first uniform resource identifier (URI) of a first picture selected by a user, the URI of the first picture corresponding to the first picture;
    acquiring a second URI of a picture to be buffered in accordance with the first URI, wherein the picture to be buffered is a preset quantity of pictures adjacent to the first picture or another picture in a folder in which the first picture is located except the first picture;
    sending the first URI and the second URI to a media renderer, to thereby cause the media renderer to acquire and display the first picture according to the first URI, and to acquire and buffer the picture to be buffered in accordance with to the second URI for display in response to the user selecting a picture corresponding to the buffered picture after the first picture is displayed.

2. The method according to claim 1, wherein the sending the first URI and the second URI to the media renderer comprises:
    sending a first control command to the media renderer, wherein the first control command carries a picture list, wherein the picture list comprises the first URI and the second URI; and
    sending a second control command to the media renderer, wherein the second control command carries a position of the first picture in the picture list, to thereby cause the media renderer to acquire the first picture according to the position of the first picture in the picture list and the picture list, to display the first picture, and to acquire and buffer the picture to be buffered.

3. The method according to claim 1, wherein the sending the first URI and the second URI to the media renderer comprises:
    sending a third control command to the media renderer, wherein the third control command carries a third URI of a picture list;
    receiving a request, which is sent by the media renderer, for acquiring the picture list, wherein the request carries the third URI;
    sending the picture list to the media renderer according to the request, wherein the picture list comprises the first URI and the second URI; and
    sending a fourth control command to the media renderer, wherein the fourth control command carries a position of the first picture in the picture list, to thereby cause the media renderer to acquire the first picture according to the position of the first picture in the picture list and the picture list, and to display the first picture, and to acquire and buffer the picture to be buffered.

4. The method according to claim 1, wherein the sending the first URI and the second URI to the media renderer comprises:
    sending a fifth control command to the media renderer, wherein the fifth control command carries the first URI, to thereby cause the media renderer to acquire the first picture according to the first URI, and to display the first picture; and
    sending a sixth control command to the media renderer, wherein the sixth control command carries a picture list, wherein the picture list comprises the second URI, to thereby cause the media renderer to acquire, according to the picture list, the picture to be buffered, and to buffer the picture to be buffered.

5. The method according to claim 1, wherein the sending the first URI and the second URI to a media renderer comprises:
    sending a seventh control command to the media renderer, wherein the seventh control command carries the first URI, to thereby cause the media renderer to acquire the first picture according to the first URI, and to display the first picture;
    sending an eighth control command to the media renderer, wherein the eighth control command carries a third URI of a picture list;
    receiving a request, which is sent by the media renderer, for acquiring the picture list, wherein the request carries the third URI; and
    sending the picture list to the media renderer according to the request, wherein the picture list comprises the second URI, to thereby cause the media renderer to acquire, according to the picture list, the picture to be buffered, and to buffer the picture to be buffered.

6. A method comprising:

acquiring a uniform resource identifier (URI) of a first picture selected by a user, the URI of the first picture uniquely corresponding to the first picture;

acquiring a URI of a picture to be buffered in accordance with the URI of the first picture, wherein the picture to be buffered is a preset quantity of pictures adjacent to the first picture or another picture in a folder in which the first picture is located except the first picture; and sending the URI of the first picture and the URI of the picture to be buffered to a media renderer, to thereby cause the media renderer to acquire and display the first picture according to the URI of the first picture, and to acquire and buffer the picture to be buffered in accordance with to the URI of the picture to be buffered, wherein the sending the URI of the first picture and the URI of the picture to be buffered to a media renderer comprises:

sending a first control command to the media renderer, wherein the first control command carries a picture list, wherein the picture list comprises the URI of the first picture and the URI of the picture to be buffered; and sending a second control command to the media renderer, wherein the second control command carries a position of the first picture in the picture list, to thereby cause the media renderer to acquire the first picture according to the position of the first picture in the picture list and the picture list, to display the first picture, and to acquire and buffer the picture to be buffered;

receiving a second picture selected by the user, and determining whether the second picture is in the picture list;

upon determining the second picture is in the picture list, sending a control command to the media renderer according to a position of the second picture in the picture list, to thereby cause the media renderer to display the second picture according to the control command; and upon determining the second picture is not in the picture list, acquiring a URI of the second picture, and acquiring, according to the URI of the second picture, a URI of another picture to be buffered, wherein the another picture to be buffered is a preset quantity of pictures adjacent to the second picture or other pictures than the second picture in a folder in which the second picture is located; and sending the URI of the second picture and the URI of the another picture to be buffered to the media renderer, to thereby cause the media renderer to acquire the second picture according to the URI of the second picture, and to display the second picture, and to acquire, according to the URI of the another picture to be buffered, the another picture to be buffered, and to buffer the another picture to be buffered.

7. The method according to claim 6, wherein the sending the control command to the media renderer according to the position of the second picture in the picture list comprises:

when the second picture is a next picture, adjacent to a picture that is currently displayed by the media renderer, in the picture list, sending a ninth control command to the media renderer, to thereby cause the media renderer to display the next picture adjacent to the picture that is currently displayed by the media renderer; or when the second picture is a previous picture, adjacent to a picture that is currently displayed by the media renderer, in the picture list, sending a tenth control command to the media renderer, to thereby cause the media renderer to display the previous picture adjacent to the picture that is currently displayed by the media renderer; or when the second picture is another picture, except a next picture and a previous picture adjacent to a picture that is currently displayed by the media renderer, in the picture list, sending an eleventh control command to the media renderer, wherein the eleventh control command carries the position of the second picture in the picture list, to thereby cause the media renderer to display the second picture according to the position of the second picture in the picture list.

8. The method according to claim 6, wherein the sending the corresponding control command to the media renderer according to the position of the second picture in the picture list comprises:

sending a twelfth control command to the media renderer, wherein the twelfth control command carries the position of the second picture in the picture list, to thereby cause the media renderer to display the second picture according to the position of the second picture in the picture list.

9. The method according to claim 7, wherein after the sending the ninth control command to the media renderer, the method further comprises:

sending a thirteenth control command to the media renderer, wherein the thirteenth control command carries URIs of a preset quantity of adjacent pictures after a last picture in the picture list, to thereby cause the media renderer to update the picture list, and to acquire the preset quantity of pictures according to the URIs of the preset quantity of pictures, and to buffer the preset quantity of pictures.

10. The method according to claim 7, wherein after the sending the tenth control command to the media renderer, the method further comprises:

sending a fourteenth control command to the media renderer, wherein the fourteenth control command carries URIs of a preset quantity of adjacent pictures before a foremost picture in the picture list, to thereby cause the media renderer to update the picture list, and to acquire the preset quantity of pictures according to the URIs of the preset quantity of pictures, and to buffer the preset quantity of pictures.

11. The method according to claim 6, wherein the determining whether the second picture is in the picture list comprises:

acquiring a position offset between the first picture and the second picture;

when the position offset is less than a preset threshold, determining that the second picture is in the picture list; and when the position offset is greater than the preset threshold, determining that the second picture is not in the picture list.

12. A method comprising:

receiving a first uniform resource identifier (URI) of a first picture, the first URI corresponding to the first picture selected by the user, and a second URI of a picture to be buffered, which are sent by a control point, wherein the picture to be buffered is a preset quantity of pictures adjacent to the first picture or another picture in a folder in which the first picture is located except the first picture;

acquiring the first picture according to the first URI, and displaying the first picture, and acquiring, according to the second URI, the picture to be buffered, and buffering the picture to be buffered; and displaying, in response to the user selecting a picture corresponding to the buffered picture after the first picture is displayed, the picture corresponding to the buffered picture.

13. The method according to claim 12, wherein the receiving a URI of a first picture and a URI of a picture to be buffered, which are sent by a control point comprises:

receiving a first control command sent by the control point, wherein the first control command carries a picture list, wherein the picture list comprises the first URI and the second URI.

14. The method according to claim 12, wherein the receiving a URI of a first picture and a URI of a picture to be buffered, which are sent by a control point comprises:

receiving a third control command sent by the control point, wherein the third control command carries a third URI of a picture list;

sending a request for acquiring the picture list to the control point according to the third URI; and receiving the picture list sent by the control point, wherein the picture list comprises the first URI and the second URI.

15. The method according to claim 12, wherein the receiving a URI of a first picture and a URI of a picture to be buffered, which are sent by a control point comprises:

receiving a fifth control command sent by the control point, wherein the fifth control command carries the first URI; and receiving a sixth control command sent by the control point, wherein the sixth control command carries a picture list, wherein the picture list comprises the second URI.

16. The method according to claim 12, wherein the receiving a URI of a first picture and a URI of a picture to be buffered, which are sent by a control point comprises:

receiving a seventh control command sent by the control point, wherein the seventh control command carries the first URI;

receiving an eighth control command sent by the control point, wherein the eighth control command carries a URI of a picture list;

sending a request for acquiring the picture list to the control point according to the third URI; and receiving the picture list sent by the control point, wherein the picture list comprises the second URI.

17. A control point comprising:

a memory storing instructions; and at least one hardware processor interfaced to the memory, wherein upon executing instructions stored in the memory, the processor implements:

acquire a first uniform resource identifier (URI) of a first picture selected by a user, the first URI corresponding to the first picture;

acquire a second URI of a picture to be buffered in accordance with the first URI, where the picture to be buffered is a preset quantity of pictures adjacent to the first picture or another picture in a folder in which the first picture is located except the first picture; and send the first URI and the second URI to a media renderer, to thereby cause the media renderer to acquire the first picture according to the first URI, and to display the first picture, and to acquire the picture to be buffered in accordance with the second URI, and to buffer the picture to be buffered for display in response to the user selecting a picture corresponding to the buffered picture after the first picture is displayed.

18. A media renderer comprising:

a memory storing instructions; and at least one hardware processor interfaced to the memory, wherein upon executing the instructions stored in the memory, the at least one hardware processor is configured to:

receive a first uniform resource identifier (URI) of a first picture selected by a user, the first URI corresponding to the first picture, and a second URI of a picture to be buffered, which are sent by a control point, where the picture to be buffered is a preset quantity of pictures adjacent to the first picture or another picture in a folder in which the first picture is located except the first picture;

acquire the first picture according to the first URI, and display the first picture, and acquire the picture to be buffered in accordance with the second URI, and buffer the picture to be buffered; and display, in response to the user selecting a picture corresponding to the buffered picture after the first picture is displayed, the picture corresponding to the buffered picture.

* * * * *